United States Patent
Chen

(10) Patent No.: US 12,430,782 B2
(45) Date of Patent: Sep. 30, 2025

(54) ITEM DISPLAY METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventor: Chunyong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 712 days.

(21) Appl. No.: 17/717,879

(22) Filed: Apr. 11, 2022

(65) Prior Publication Data

US 2022/0237812 A1    Jul. 28, 2022

Related U.S. Application Data

(63) Continuation of application No. PCT/CN2021/080601, filed on Mar. 12, 2021.

(30) Foreign Application Priority Data

Apr. 23, 2020 (CN) .......................... 202010328531.9

(51) Int. Cl.
  *G06T 7/55* (2017.01)
  *G06Q 30/0601* (2023.01)
  (Continued)

(52) U.S. Cl.
  CPC .......... *G06T 7/55* (2017.01); *G06Q 30/0643* (2013.01); *G06T 7/11* (2017.01); *G06T 17/00* (2013.01)

(58) Field of Classification Search
  None
  See application file for complete search history.

(56) References Cited

U.S. PATENT DOCUMENTS

2015/0003724 A1   1/2015   Noguchi
2015/0062120 A1*  3/2015   Reisner-Kollmann .......................
                                                G06T 19/006
                                                345/419
(Continued)

FOREIGN PATENT DOCUMENTS

CN     102722862 A    10/2012
CN     105550701 A    5/2016
(Continued)

OTHER PUBLICATIONS

The World Intellectual Property Organization (WIPO) International Search Report for PCT/CN2021/080601 Jun. 2, 2021 7 Pages (including translation).

*Primary Examiner* — Peter Hoang
(74) *Attorney, Agent, or Firm* — ANOVA LAW GROUP PLLC

(57) ABSTRACT

An item display method includes: displaying a live stream interface, the live stream interface including a live stream image, and the live stream image including a target item; obtaining a plurality of depth images of a target item according to a plurality of two-dimensional images of the target item, display angles of the target item in the plurality of two-dimensional images being different, and the depth images including pixel information and depth information; fusing the plurality of depth images to generate a three-dimensional image of the target item, and displaying the three-dimensional image through the live stream interface.

19 Claims, 8 Drawing Sheets

(51) Int. Cl.
*G06T 7/11* (2017.01)
*G06T 17/00* (2006.01)

(56) References Cited

U.S. PATENT DOCUMENTS

| | | | |
|---|---|---|---|
| 2015/0116503 A1* | 4/2015 | Fredlund | G06F 3/0304 |
| | | | 348/169 |
| 2018/0205941 A1* | 7/2018 | Kopf | H04N 13/261 |
| 2020/0082170 A1* | 3/2020 | Kwon | G06F 18/22 |
| 2021/0124475 A1* | 4/2021 | Inch | G06F 3/011 |
| 2021/0165923 A1* | 6/2021 | Johnston | G06F 1/163 |

FOREIGN PATENT DOCUMENTS

| | | |
|---|---|---|
| CN | 108462889 A | 8/2018 |
| CN | 109889855 A | 6/2019 |
| CN | 110784728 A | 2/2020 |
| CN | 111541907 A | 8/2020 |
| EP | 1093089 A2 | 4/2001 |

\* cited by examiner

ITEM DISPLAY METHOD, APPARATUS, AND DEVICE, AND STORAGE MEDIUM

CROSS-REFERENCES TO RELATED APPLICATIONS

This application is a continuation application of PCT Patent Application No. PCT/CN2021/080601, entitled "OBJECT DISPLAY METHOD AND APPARATUS, DEVICE AND STORAGE MEDIUM" and filed on Mar. 12, 2021, which claims priority to Chinese Patent Application No. 202010328531.9, entitled "ITEM DISPLAY METHOD, APPARATUS, AND DEVICE, AND STORAGE MEDIUM" and filed on Apr. 23, 2020, the entire contents of both of which are incorporated herein by reference.

FIELD OF THE TECHNOLOGY

Embodiments of the present disclosure relate to the field of computer application technologies, and in particular, to an item display method, apparatus, and device, and a storage medium.

BACKGROUND OF THE DISCLOSURE

With the development of computer technologies and the wide application of e-commerce live stream, many live stream hosts recommend items during a live stream. The item recommended by the live stream host is displayed on a live stream image, and the user can view the recommended item by watching the live stream image.

SUMMARY

Embodiments of the present disclosure provide an item display method, apparatus, and device, and a storage medium. The technical solutions are as follows:

According to one aspect, an item display method is provided, the method including: displaying a live stream interface, the live stream interface including a live stream image, and the live stream image including a target item; obtaining a plurality of depth images of a target item according to a plurality of two-dimensional images of the target item, display angles of the target item in the plurality of two-dimensional images being different, and the depth images including pixel information and depth information; fusing the plurality of depth images to generate a three-dimensional image of the target item; and displaying the three-dimensional image through the live stream interface.

According to another aspect, an item display apparatus is provided, the apparatus including: an interface display module, configured to display a live stream interface, the live stream interface including a live stream image, and the live stream image including a target item; a depth image obtaining module, configured to obtain a plurality of depth images of the target item according to a plurality of two-dimensional images of the target item, display angles of the target item in the plurality of two-dimensional images being different, and the depth image including pixel information and depth information; a three-dimensional image generation module, configured to fuse the plurality of depth images to generate a three-dimensional image of the target item; and a three-dimensional image display module, configured to display the three-dimensional image through the live stream interface.

According to another aspect, a computer device is provided, the computer device including a processor and a memory, the memory storing at least one segment of program code, and the at least one segment of program code being loaded and executed by the processor to implement: displaying a live stream interface, the live stream interface including a live stream image, and the live stream image including a target item; obtaining a plurality of depth images of a target item according to a plurality of two-dimensional images of the target item, display angles of the target item in the plurality of two-dimensional images being different, and the depth images including pixel information and depth information; fusing the plurality of depth images to generate a three-dimensional image of the target item; and displaying the three-dimensional image through the live stream interface.

According to another aspect, a non-transitory computer-readable storage medium is provided, the computer-readable storage medium storing at least one segment of program code, and the at least one segment of program code being loaded and executed by a processor to implement an operation performed in the item display method.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from the accompanying drawings without creative efforts.

DESCRIPTION OF EMBODIMENTS

Figure 1:
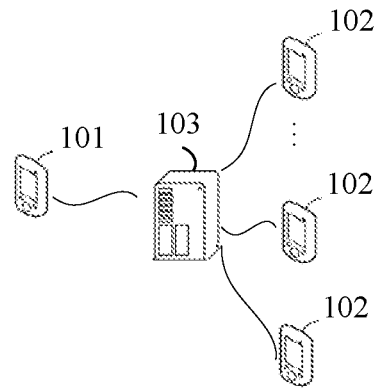
FIG. 1 is a schematic diagram of an implementation environment according to an embodiment of the present disclosure.

To make objectives, technical solutions, and advantages of the embodiments of the present disclosure clearer, the following further describes in detail implementations of the present disclosure with reference to the accompanying drawings.

It may be understood that the terms "first", "second", and the like used in the present disclosure may be used for describing various concepts in this specification. However, the concepts are not limited by the terms unless otherwise specified. The terms are merely used for distinguishing one concept from another concept. For example, without departing from the scope of the present disclosure, a first position may be referred to as a second position, and similarly, the second position may be referred to as the first position.

For the terms "each", "a plurality of", "at least one", and "any" used in the present disclosure, "a plurality of" refers to two or more, "each" refers to each of the corresponding plural, "at least one" refers to one, two or more of the plural, and "any" refers to any one of the plural. For example, a plurality of two-dimensional partial images include 20 two-dimensional partial images, and each two-dimensional partial image refers to each of the 20 two-dimensional partial images.

For convenience of understanding an item display method provided in the embodiments of the present disclosure, keywords related in the embodiments of the present disclosure are introduced.

Depth image: The depth image in the present disclosure includes pixel information and depth information, that is, the depth image includes a red green blue (RGB) three-channel color image and a depth map. In three-dimensional (3D) computer graphics, the depth map is similar to a grayscale image, and a value corresponding to each pixel of the depth map is an actual distance between an image sensor photographing an image and an object being photographed, that is, a depth value. The RGB image and the depth map are registered, and there is a one-to-one correspondence between pixels.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer sciences, attempts to understand essence of intelligence, and produces a new intelligent machine that can react in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a speech processing technology, a natural language processing technology, and machine learning/deep learning (DL).

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific subject, the CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine learning (ML) is a multi-disciplinary subject involving a plurality of disciplines such as probability theory, statistics, approximation theory, convex analysis, and algorithm complexity theory. The machine learning specializes in studying how a computer simulates or implements a human learning behavior to obtain new knowledge or skills, and reorganize an existing knowledge structure, so as to keep improving its performance. The machine learning is a core of the AI, is a basic way to make the computer intelligent, and is applied to various fields of the AI. The ML and deep learning generally include technologies such as an artificial neural network, a belief network, reinforcement learning, transfer learning, inductive learning, and learning from demonstrations.

The item display method provided in the embodiments of the present disclosure relate to technologies such as AI computing and CV of AI, and the item display method is described by using the following embodiments.

FIG. 1 is a schematic diagram of an implementation environment according to an embodiment of the present disclosure. Referring to FIG. 1, the implementation environment includes a host terminal 101, at least one viewer terminal 102, and a server 103.

The host terminal 101 and the viewer terminal 102 are various types of terminals such as a portable terminal, a pocket terminal, and a handheld terminal, and for example, are a smart phone, a tablet computer, a notebook computer, a desktop computer, a smart speaker, a smart watch, or the like. The server 103 is an independent physical server, or is a server cluster or a distributed system formed by a plurality of physical servers, or is a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The host terminal 101 is connected to the server 103, and the at least one viewer terminal 102 is connected to the server 103. The host terminal 101 and the server 103, and the viewer terminal 102 and the server 103 are directly or indirectly connected through wired or wireless communication, which is not limited in the present disclosure.

The live stream host performs a live stream through the host terminal 101, the host terminal 101 transmits live stream data to the server 103, the server 103 transmits the live stream data to the viewer terminal 102, and the viewer terminal 102 displays a live stream interface according to the live stream data, and displays a three-dimensional image of a target item through the live stream interface.

In one embodiment, the host terminal 101 generates a three-dimensional image of the target item, and transmits the three-dimensional image to the server 103, the server 103 then transmits the three-dimensional image to the viewer terminal 102, and the viewer terminal 102 displays the three-dimensional image; alternatively, the server 103 generates a three-dimensional image of the target item, and transmits the three-dimensional image to the viewer terminal 102, and the viewer terminal 102 displays the three-dimensional image; alternatively, the viewer terminal 102 generates a three-dimensional image and displays the three-dimensional image.

The item display method provided in the embodiments of the present disclosure is applicable to various scenarios.

For example, the item display method is applicable to a scenario of recommending items in a live stream.

During a live stream, when a live stream host recommends an item to the user, the recommended item is included in a live stream image. By using the item display method provided in the embodiments of the present disclosure, a three-dimensional image of the recommended item is obtained, and the three-dimensional image is displayed through the live stream interface, so that the user can fully know an appearance of the item.

For another example, the item display method is applicable to a scenario of playing a video online.

During playing a video in a live stream room, when an item is displayed in the video, by using the item display method provided in the embodiments of the present disclosure, a three-dimensional image of the item displayed in the video is obtained, and the three-dimensional image is displayed through a live stream interface, so that the user can fully know the displayed item.

Figure 2:
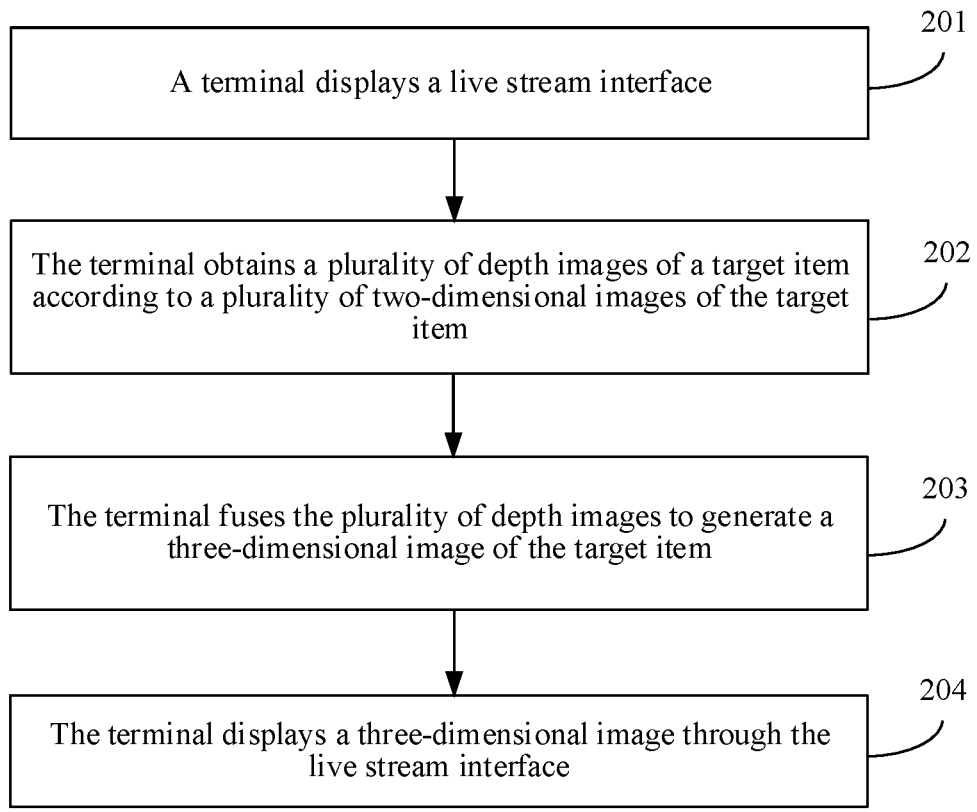
FIG. 2 is a flowchart of an item display method according to an embodiment of the present disclosure.

FIG. 2 is a flowchart of an item display method according to an embodiment of the present disclosure. An execution entity of this embodiment of the present disclosure is a terminal. Referring to FIG. 2, the method includes the following steps:

201. A terminal displays a live stream interface.

In this embodiment of the present disclosure, the host terminal generates live stream data, and transmits the live stream data to the server, the server transmits the live stream data to the viewer terminal, and the viewer terminal displays the live stream interface according to the received live stream data.

In one embodiment, both the host terminal and the viewer terminal are installed with live stream applications. The host terminal generates live stream data through the live stream application, and transmits the live stream data to the server corresponding to the live stream application, the server transmits the live stream data to the viewer terminal, and the viewer terminal displays a live stream interface through the live stream application.

This embodiment of the present disclosure is described by only using an example in which a terminal is served as a viewer terminal. A live stream interface includes a live stream image, the live stream image includes a target item, and the target item is an item recommended by a live stream host in the live stream image. The live stream image further includes a person or other items other than the target item.

In one embodiment, the live stream interface further includes an item display button, and the item display button is used to control the display of a three-dimensional image of the target item in the live stream interface. The shape of the item display button matches the shape of the target item. For example, the item display button includes a thumbnail image of the target item, or the shape of the item display button is a fixed shape. The embodiments of the present disclosure do not limit the shape of the item display button. In addition, the item display button is located at any position in the live stream interface, and the embodiments of the present disclosure do not limit a display position of the item display button.

In some embodiments, the item display button is associated with the three-dimensional image of the target item in the current live stream image, and the three-dimensional image of the target item in the current live stream image is displayed by performing a trigger operation on the item display button. When the target item in the live stream image changes, the three-dimensional image associated with the item display button also changes accordingly. In addition, when the item display button is the thumbnail image of the target item, when the target item in the live stream image changes, the image of the item display button also changes.

In one embodiment, a live stream interface further includes a plurality of reference items. The plurality of reference items are items set by the live stream host, including items that the live stream host has recommended, is recommending, or has not yet recommended during the live stream. The live stream interface further includes a reference item display button, and in response to a trigger operation on the reference item display button, a plurality of reference items are displayed in the live stream interface.

202. The terminal obtains a plurality of depth images of a target item according to a plurality of two-dimensional images of the target item.

In the embodiments of the present disclosure, during the live stream, the terminal obtains a depth image of a target item according to the target item included in a live stream interface, and generates a three-dimensional image for the target item according to a plurality of depth images of the target item.

In the embodiments of the present disclosure, the two-dimensional image of the target item only includes a target item, and each two-dimensional image includes images of the target item at different display angles. The more display angles of the plurality of two-dimensional images, the better the effect of the generated final three-dimensional image is. The embodiments of the present disclosure do not limit the quantity of obtained two-dimensional images, and only needs to obtain a corresponding quantity of two-dimensional images according to the display effect requirement of the three-dimensional image.

In one embodiment, the two-dimensional image of the live stream interface includes the target item and other items. The terminal obtains a plurality of two-dimensional images of the live stream image by intercepting the live stream image, and the plurality of two-dimensional images are respectively segmented, the plurality of two-dimensional segmented images just include the target item and do not include other items in the live stream image.

In some embodiments, during intercepting a live stream image, a plurality of frames of images are intercepted within a reference period. For example, the reference period is 1 second, and 12 frames are intercepted per second. During the live stream, the live stream host displays a plurality of angles of the target item to the user, and the live stream image includes consecutive multi-frame images. The consecutive multi-frame images are intercepted, and the intercepted multi-frame images include a plurality of display angles of the target item.

In some embodiments, the segmenting, by the terminal, the plurality of two-dimensional images includes: performing, by the terminal, mask processing on the plurality of two-dimensional images, that is, covering images of items other than the target item in the two-dimensional image, so that only the target item is included in the two-dimensional image. The mask processing on the two-dimensional image is performed by using rotoscoping (a rotary scanning machine technology), to obtain a two-dimensional image that only includes the target item after the mask processing.

In another embodiment, in response to the target item being matched with a reference item in the live stream interface, the terminal obtains a plurality of two-dimensional images of the target item. That is, the terminal needs to determine whether the target item in the current live stream image is any reference item, and if the target item is any reference item, a plurality of two-dimensional images of the target item are obtained to generate a three-dimensional image for the target item subsequently; and if the target item is not any reference items, no three-dimensional image is generated for the target item, thus ensuring that only the reference item is generated.

In one embodiment, the terminal obtains a similarity between the target item and any reference item in the live stream interface according to item information of the target item and item information of the reference item; and in response to the similarity being greater than a reference similarity, obtains a plurality of two-dimensional images of the target item. The item information includes an item category, an item name, an item color, or the like, the similarity represents the similarity degree between the target item and any reference item, and the reference similarity is any numerical value. The greater similarity indicates that the possibility that the target item is the reference item is greater, and the smaller similarity indicates that the possibility that the target item is the reference item is smaller.

In one embodiment, what the terminal obtains is a two-dimensional image of the live stream image. In addition to the target item, the two-dimensional image of the live stream image further includes other items. The terminal recognizes the two-dimensional image of the live stream image through an image recognition model, and recognizes the target item in the two-dimensional image of the live stream image.

In some embodiments, the host terminal converts light information, sound information, etc. in the current environment into electrical information through a sensor to obtain image information. The host terminal transmits the obtained image information to a server, and the server performs preprocessing on the obtained image information to enhance the image information, the preprocessing including denoising, smoothing, transformation and other processing. The server transmits the processed image information to the terminal, and the terminal inputs the processed image information into the image recognition model, and performs recognition by the image recognition model.

In some embodiments, the image recognition model includes a region division layer, an aggregation layer, and a recognition layer. The recognition by the image recognition model includes the following steps:

1. The terminal divides a live stream image into a plurality of image regions through a region division layer in the region recognition model, to obtain image features of the plurality of image regions.

Each pixel region is a 1*1 pixel block, a 3*3 pixel block, a 5*5 pixel block, or a pixel block in other sizes. Image features are represented in a form of arrays, and an array includes a height value, a width value and a color value of a pixel block.

2. The terminal aggregates image information of the plurality of image regions through an aggregation layer in the image recognition model, to obtain an aggregated image feature of the target item.

The image information of the plurality of image regions is aggregated through a sampling function, and the sampling function is used to aggregate the plurality of image regions into a complete item image. Then, feature extraction is performed on the item image to obtain aggregated image features.

3. The terminal recognizes the aggregated image feature through a recognition layer in the image recognition model, to determine a target item matched by the aggregated image feature.

In some embodiments, the recognition layer is a classifier, and performs recognition on the aggregated image feature through a recognition rule obtained by training to obtain the target item matching the aggregated image feature. In addition, the recognition layer can further classify the target item by using the recognition rule to obtain a category of the target item.

After the terminal obtains a plurality of two-dimensional images of the target item in response to the recognized target item being matched with a reference item in the live stream interface, the terminal obtains a plurality of depth images of the target item according to the plurality of two-dimensional images. The depth image includes pixel information and depth information. The pixel information represents a color value of each pixel in the depth image, the depth information represents a depth value of each pixel in the depth image, and the color value of each pixel is in a one-to-one correspondence with the depth value of each pixel.

In one embodiment, for each two-dimensional image, the terminal performs depth allocation on the two-dimensional image to obtain depth information of each pixel in the two-dimensional image, and fuses the depth information of each pixel with corresponding pixel information to obtain a depth image of the target item. When the depth allocation is performed, the depth information of each pixel is arbitrarily allocated, and is an arbitrary value.

In some embodiments, after the terminal fuses the depth information of each pixel with the corresponding pixel information to obtain the depth image of the target item, if the obtained depth image does not meet a condition, the depth information of each pixel in the two-dimensional image is readjusted and then fused until the condition is met. Besides, the more times the depth information of each pixel in the two-dimensional image is adjusted, the better the display effect of the obtained depth image is. The depth image meeting the condition means that the depth information of each pixel in the depth image is consistent with the depth value when the target item is displayed.

In one embodiment, the obtaining, by the terminal, a plurality of depth images of the target item according to the plurality of two-dimensional images includes: the terminal obtaining depth images corresponding to the plurality of two-dimensional images, and using the depth images corresponding to the plurality of two-dimensional images as the depth images of the target item. That is, the depth image of the target item only includes the depth image corresponding to the two-dimensional image.

In some embodiments, the obtaining, by the terminal, a plurality of depth images of the target item according to the plurality of two-dimensional images further includes: the terminal respectively performing mirror image processing on the plurality of two-dimensional images to obtain a mirrored two-dimensional image corresponding to each two-dimensional image; and obtaining depth images corresponding to the plurality of mirrored two-dimensional images, and using the depth images corresponding to the plurality of mirrored two-dimensional images as the depth images of the target item. That is, the depth image of the target item includes the depth image corresponding to the two-dimensional image and the depth image corresponding to the two-dimensional mirror image. The mirrored two-dimensional image corresponding to the two-dimensional image means that a left-right direction of each position point in the mirrored two-dimensional image is opposite to that of a corresponding position point in the two-dimensional image. For example, a specific position point in the two-dimensional image is located in an upper left corner, and a corresponding position point in the corresponding mirrored two-dimensional image is located in an upper right corner.

The foregoing process of obtaining a depth image corresponding to a mirror image by performing the mirror image processing is a supplement to information of the two-dimensional image, which avoids a case that the display angles of the plurality of obtained two-dimensional images are incomplete, causing that the generated three-dimensional image cannot accurately display all angles of the target item. By performing the mirror image processing on an image, the two-dimensional image in other angles is added, and more images are generated, which ensures that the generated three-dimensional image is more accurate.

In one embodiment, the terminal further supplements the two-dimensional image with other information, for example, background information and transparency information of the two-dimensional image. By performing information supplement and multi-level processing on the two-dimensional image, the display effect of the corresponding depth image is improved.

203. The terminal fuses the plurality of depth images to generate a three-dimensional image of the target item.

In one embodiment, a server filters the plurality of depth images according to display angles of the plurality of depth images, retains one depth image for each display angle, and fuses the plurality of depth images remained after filtering to generate a three-dimensional image of the target item.

204. The terminal displays the three-dimensional image through the live stream interface.

In the embodiments of the present disclosure, after the terminal generates the three-dimensional image, the three-dimensional image is displayed through the live stream interface, so that the user can view the three-dimensional image on the live stream interface.

In one embodiment, the terminal displays the three-dimensional image through an item display region of the live stream interface, and the item display region is different from a region where the live stream image is located. That is, the live stream interface is divided into at least two regions. One region is used to display the live stream image, and the other region is used to display the item. When the item display region is different from a region where the live stream image is located, the live stream image and the three-dimensional image are independently displayed, and the complete live stream image and three-dimensional image are displayed on the live stream interface.

In some embodiments, a display region display button is set in the live stream interface, and in response to a trigger operation of the display region display button, the item display region is displayed.

In another embodiment, the terminal creates a floating layer on an upper layer of the live stream image, and displays the three-dimensional image by the floating layer. The created floating layer is located at any position on the upper layer of the live stream image, and a size of the floating layer is smaller than or equal to a size of the live stream interface. In this case, the floating layer is located above the live stream image, which may cover part or all of the live stream image.

In some embodiments, in response to a drag operation on the floating layer, the terminal moves the floating layer from a first position on the upper layer of the live stream image to a second position on the upper layer of the live stream image, where the first position and the second position are different positions. That is, a display position of the floating layer can be changed, and by moving a position of the floating layer, the floating layer is prevented from blocking a region that the user pays attention to in the live stream image.

After the terminal displays the floating layer, the following two implementations are used to close the floating layer:

in one embodiment, in response to a trigger operation on other positions except the floating layer in the live stream interface, the terminal closes the floating layer. The trigger operation is a click operation, a sliding operation, or other operations.

In another embodiment, in response to a re-trigger operation of the item display button, the terminal closes the floating layer.

When the floating layer is opened and closed by performing the trigger operation on the item display button, the terminal determines whether the floating layer is displayed on the upper layer of a current live stream image. If the floating layer is displayed on the upper layer of the live stream image, a trigger operation is performed on the item display button to close the floating layer, and the live stream image under the floating layer is displayed; and if no floating layer is displayed on the upper layer of the live stream image, the trigger operation is performed on the item display button to open the floating layer, and the floating layer is displayed on the upper layer of the live stream image.

In one embodiment, when obtaining the three-dimensional image of the target item, a computer device obtains an item name of the target item, and displays the three-dimensional image and the item name of the target item through the live stream interface, so that the user can know the item name of the target item.

In some embodiments, the three-dimensional image and the item name of the target item are displayed through the item display region in the live stream interface or the three-dimensional image and the item name of the target item are displayed through the floating layer, or are displayed in other manners.

In one embodiment, the live stream interface further includes at least one tag, the at least one tag being located in the three-dimensional image, and each tag being associated with a two-dimensional partial image of a corresponding position. After the terminal displays the three-dimensional image through the live stream interface, in response to a trigger operation on any tag, the terminal obtains a two-dimensional partial image associated with a triggered tag; and displays the two-dimensional partial image through the live stream interface. The foregoing implementation of displaying a two-dimensional partial image is similar to an implementation of displaying a two-dimensional partial image in the embodiment shown in FIG. 3, and reference can be made to the embodiment shown in FIG. 3 below.

This embodiment of the present disclosure is described by only using an example in which a terminal is served as an execution entity. In another embodiment, the foregoing 202 to 203 are executed by the server. The server obtains the plurality of two-dimensional images of the target item, obtains the plurality of depth images of the target item according to the plurality of two-dimensional images, and fuses the plurality of depth images to generate the three-dimensional image of the target item. The server transmits the generated three-dimensional image of the target item to the terminal, and the terminal displays the three-dimensional image through the live stream interface.

This embodiment of the present disclosure is described by only using an example in which a terminal is served as a viewer terminal. In another embodiment, the terminal is a host terminal. The host terminal obtains the plurality of two-dimensional images of the target item, obtains the plurality of depth images of the target item according to the plurality of two-dimensional images, fuses the plurality of depth images to generate the three-dimensional image of the target item, displays the three-dimensional image through the live stream interface, and transmits the generated three-dimensional image to the server. The server transmits the generated three-dimensional image to the host terminal, and the host terminal displays the three-dimensional image through the live stream interface.

In related art, due to the impact of an environment where the live stream host is in, the beautification processing performed on the live stream image, and the like, the item displayed in the live stream image is quite different from an actual item, and the display effect is distorted. As a result, the user cannot fully know an appearance of the item.

In the method provided in this embodiment of the present disclosure, a corresponding three-dimensional image is generated for the target item according to the two-dimensional image of the target item displayed in the live stream interface. Because the three-dimensional image includes a plurality of display angles of the target item, and the three-dimensional image of the target item is not affected by the environment where the live stream host is in and the beautification processing performed on the live stream image, an appearance of the target item can be truly reflected, and the display effect can be improved. Therefore, the user can fully know an appearance of the item according to the displayed three-dimensional image during watching a live stream.

In addition, before a plurality of two-dimensional images of the target item are obtained, the target item is matched with a reference item to ensure that the generated three-dimensional image is the three-dimensional image of the item recommended by the live stream host, which avoids the generation of the three-dimensional image for other non-recommended items in the live stream image, thereby reducing unnecessary operations.

Figure 3:
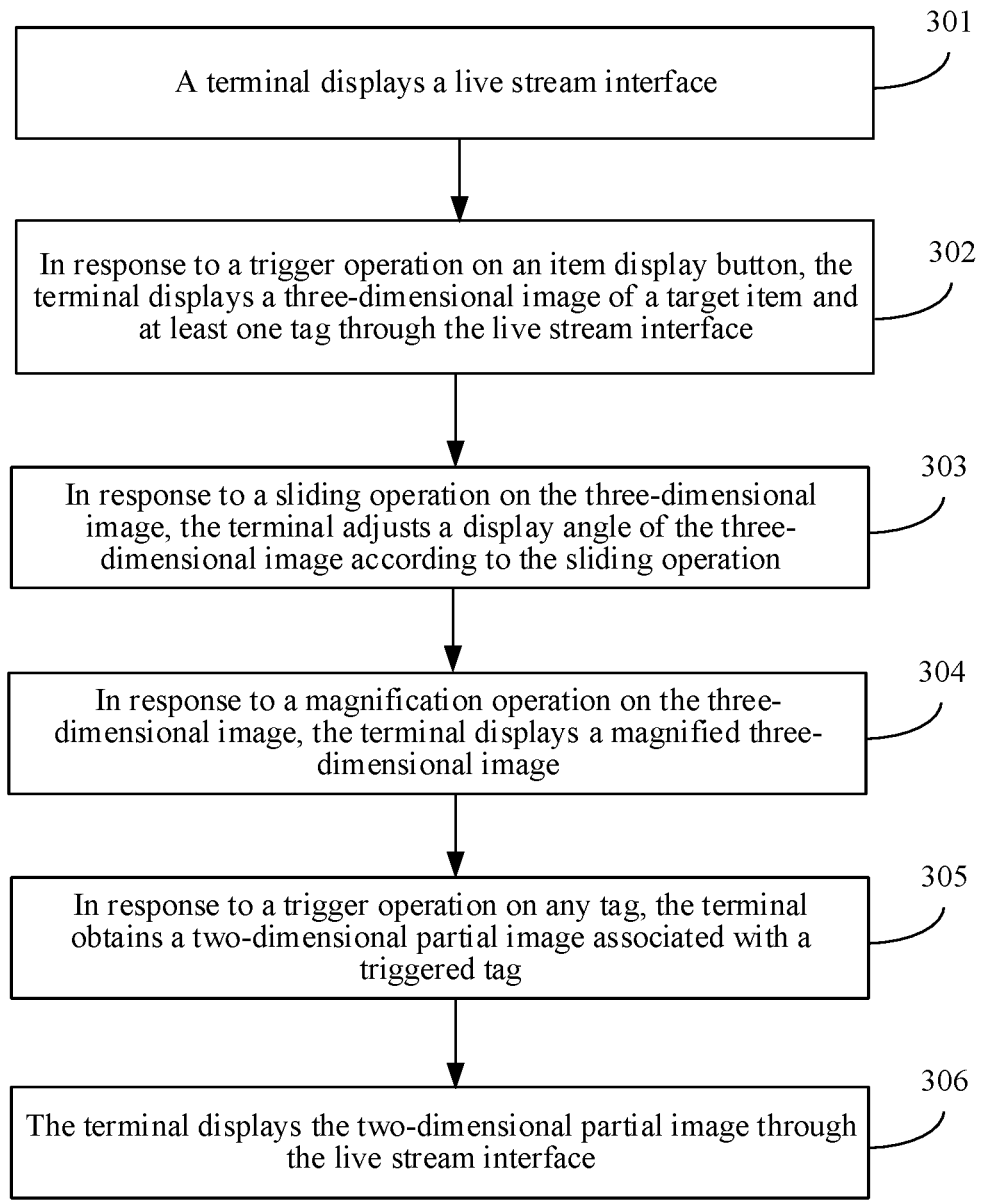
FIG. 3 is a flowchart of another item display method according to an embodiment of the present disclosure.

FIG. 3 is a flowchart of an item display method according to an embodiment of the present disclosure. An execution entity of this embodiment of the present disclosure is a terminal. Referring to FIG. 3, the method includes:

301. A terminal displays a live stream interface.

An implementation of 301 is similar to the implementation of 201 in the embodiment shown in FIG. 2, and is not repeated herein.

302. In response to a trigger operation on the item display button, the terminal displays a three-dimensional image of the target item and at least one tag through the live stream interface.

In the embodiments of the present disclosure, before displaying the three-dimensional image of the target item, the terminal generates the three-dimensional image of the target item by using the method shown in the foregoing 202 to 203. According to different generation timing of the three-dimensional image, the following two example embodiments are included:

In one embodiment, before the terminal displays the live stream interface, the server receives the live stream image transmitted by the host terminal, generates the three-dimensional image of the target item according to the live stream image, and then transmits the live stream image to the terminal, and the terminal displays the live stream interface; alternatively, the server synchronously performs the process of generating the three-dimensional image of the target item according to the live stream image and the process of transmitting the live stream image to the terminal. In either manner, the three-dimensional image of the target item has been generated before the terminal responds to the trigger operation of the item display button, and in response to the trigger operation of the item display button, the terminal obtains the generated three-dimensional image of the target item.

In another embodiment, during displaying the live stream interface on the terminal, in response to the trigger operation of the item display button, the terminal recognizes the target item in a current live stream image, and generates a three-dimensional image of the target item according to the target item included in the live stream image.

In some embodiments, the terminal currently displaying the live stream interface recognizes the target item and generates the three-dimensional image of the target item, or the server recognizes the target item to generate the three-dimensional image of the target item.

In the embodiments of the present disclosure, an implementation of displaying a three-dimensional image is similar to the implementation of 204 in the embodiment shown in FIG. 2, and is not repeated herein. The difference is that in 302, the terminal further displays at least one tag through the live stream interface.

The at least one tag is located in the three-dimensional image, and each tag is associated with a two-dimensional partial image of a corresponding position in the three-dimensional image. The two-dimensional partial image is a partial image of a specific position of the target item, and each tag indicates that a two-dimensional partial image is set at the position. Compared with the three-dimensional image, the two-dimensional partial image has higher accuracy than the three-dimensional image.

In some embodiments, a tag in the three-dimensional image includes text content, or does not include text content. If the tag does not include text content, the tag is displayed in any shape. In some embodiments, when the three-dimensional image includes a plurality of tags, the shapes of the plurality of tags are the same or different, for example, a solid circle represents a tag. If the tag includes text content, the text content in the tag is used to describe the two-dimensional partial image. For example, if the three-dimensional image is a shoe, and the tag content is a shoe upper, the tag is located at the shoe upper in the three-dimensional image, and the associated two-dimensional partial image is a shoe upper image.

In one embodiment, the terminal displays the three-dimensional image of the target item and at least one tag through the item display region in the live stream interface or, or displays the three-dimensional image of the target item and at least one tag through the floating layer.

In one embodiment, the terminal obtains at least one two-dimensional partial image of the target item, matches the at least one two-dimensional partial image of the target item with the three-dimensional image, and determines a position of each two-dimensional partial image in the three-dimensional image; creates at least one tag associated with the two-dimensional partial image; and displays the three-dimensional image through the live stream interface, and displays a tag associated with the corresponding two-dimensional partial image at the position of each two-dimensional partial image in the three-dimensional image.

In some embodiments, during the matching, the terminal determines, according to image information of the two-dimensional partial image and image information of the three-dimensional image, an image region of the image information similar to the image information of the two-dimensional partial image in the image information of the three-dimensional image. The image region is a region corresponding to the two-dimensional partial image in the three-dimensional image.

In some embodiments, after determining the position of each two-dimensional partial image in the three-dimensional image, the terminal recognizes the two-dimensional partial image to obtain attribute information of the two-dimensional partial image, creates a tag associated with the two-dimensional partial image according to the attribute information, and displays the tag associated with the corresponding two-dimensional partial image at the determined position of the two-dimensional partial image in the three-dimensional image.

In one embodiment, in response to the target item being matched with a reference item in the live stream interface, the terminal obtains at least one two-dimensional partial image of any reference item as the two-dimensional partial image of the target item. This embodiment of the present disclosure does not limit a matching manner of the target item with the reference item, and any manner can be used for matching, for example, an image of the target item is matched with an image of any reference item.

In some embodiments, the server stores two-dimensional partial images of a plurality of reference items, and in response to the target item being matched with a reference item in the live stream interface, the terminal transmits a partial image obtaining instruction of the reference item to the server. The server transmits the two-dimensional partial image of the reference item to the terminal, and the terminal uses the obtained two-dimensional partial image of the reference item as the two-dimensional partial image of the target item.

303. In response to a sliding operation on the three-dimensional image, the terminal adjusts a display angle of the three-dimensional image according to the sliding operation.

In one embodiment, the sliding operation includes a sliding direction and a sliding distance. The sliding direction determines a change direction of the three-dimensional image, and the sliding distance determines a change range of the display angle of the three-dimensional image. For example, a current display angle of the three-dimensional image is the front of the target item. By gradually sliding to the left, the front of the target item is gradually shifted into a left side of the target item, and by continuing to slide to the left, the back of the target item gradually appears.

In some embodiments, a coordinate system is created according to the three-dimensional image to obtain coordinates of a starting point and coordinates of an ending point corresponding to the sliding operation, and the sliding direction and the sliding distance are determined according to the coordinates of the starting point and the coordinates of the ending point.

A process of adjusting the display angle of the three-dimensional image by the terminal is a process of rotating the three-dimensional image, and the three-dimensional image is rotated by any degree, for example, the three-dimensional image is rotated by 360 degrees or other degrees.

304. In response to a magnification operation on the three-dimensional image, the terminal displays a magnified three-dimensional image.

For the magnification operation, the terminal sets an image magnification button in a displayed live stream interface, and in response to a trigger operation of the image magnification button, the terminal magnifies the three-dimensional image. In some embodiments, it is set that the trigger operation is performed on the image magnification button to magnify the three-dimensional image to the reference ratio. In some embodiments, a maximum magnification ratio is set. When the magnification ratio of the three-dimensional image reaches the maximum magnification ratio, if the trigger operation is performed on the image magnification button again, the three-dimensional image is no longer magnified. Alternatively, the terminal magnifies the three-dimensional image in response to a click operation on any position of the three-dimensional image, where the click operation is a single-click operation or a double-click operation. Alternatively, the terminal magnifies the three-dimensional image in response to sliding operations in two opposite directions starting from any position of the three-dimensional image.

In some embodiments, in response to the sliding operation on the magnified three-dimensional image, the terminal adjusts a display angle of the magnified three-dimensional image according to the sliding operation.

305. In response to a trigger operation on any tag, the terminal obtains a two-dimensional partial image associated with a triggered tag.

The trigger operation is a click operation or the like.

In one embodiment, in response to the trigger operation on any tag, the terminal transmits a partial image obtaining instruction to the server, and the partial image obtaining instruction carries a triggered tag. The server obtains the two-dimensional partial image associated with the triggered tag, and transmits the two-dimensional partial image associated with the triggered tag to the terminal.

In another embodiment, in response to the trigger operation on any tag, the terminal transmits a partial image obtaining instruction to the server, and the partial image obtaining instruction carries a triggered tag. The server obtains at least one two-dimensional partial image of the target item, and transmits the at least one two-dimensional partial image to the terminal.

306. The terminal displays the two-dimensional partial image through the live stream interface.

In the embodiments of the present disclosure, after displaying the two-dimensional partial image through the live stream interface, the terminal performs operation on the two-dimensional partial image to view the two-dimensional partial image.

In one embodiment, in response to a magnification operation on the two-dimensional partial image, the terminal displays a magnified two-dimensional partial image through the live stream interface. The magnification operation on the two-dimensional partial image is similar to the foregoing magnification operation on the three-dimensional image, and is not repeated herein.

In one embodiment, in response to the sliding operation on the two-dimensional partial image, the terminal displays another two-dimensional partial image matching a sliding direction according to a sliding direction of the sliding operation. The sliding direction is sliding left, sliding right, or sliding in other directions.

In some embodiments, at least one two-dimensional partial image of the target item is arranged in a reference order, and a sliding operation is performed on a currently displayed two-dimensional partial image to display a next two-dimensional partial image or a previous two-dimensional partial image of the current two-dimensional partial image. If the currently displayed two-dimensional partial image is the first two-dimensional partial image in the at least one two-dimensional partial image, the two-dimensional partial image can only be slid to the right to display the next two-dimensional partial image; and if the currently displayed two-dimensional partial image is the last two-dimensional partial image in the at least one two-dimensional partial image, the two-dimensional partial image can only be slid to the left to display the previous two-dimensional partial image; and in some embodiments, in response to the sliding operation on the two-dimensional partial image, the terminal obtains the another two-dimensional partial image matching the sliding direction according to the sliding direction of the sliding operation, and then displays the another two-dimensional partial image. For example, the terminal transmits an obtaining instruction for the another two-dimensional partial image to the server, thereby obtaining the another two-dimensional partial image from the server.

Alternatively, based on an optional manner in the foregoing 305, the server has transmitted at least one two-dimensional partial image of the target item to the terminal after the terminal detects a trigger operation on any tag, and in response to the sliding operation on the two-dimensional partial image, the terminal directly displays the another two-dimensional partial image matching a sliding direction according to a sliding direction of the sliding operation.

Figure 4:
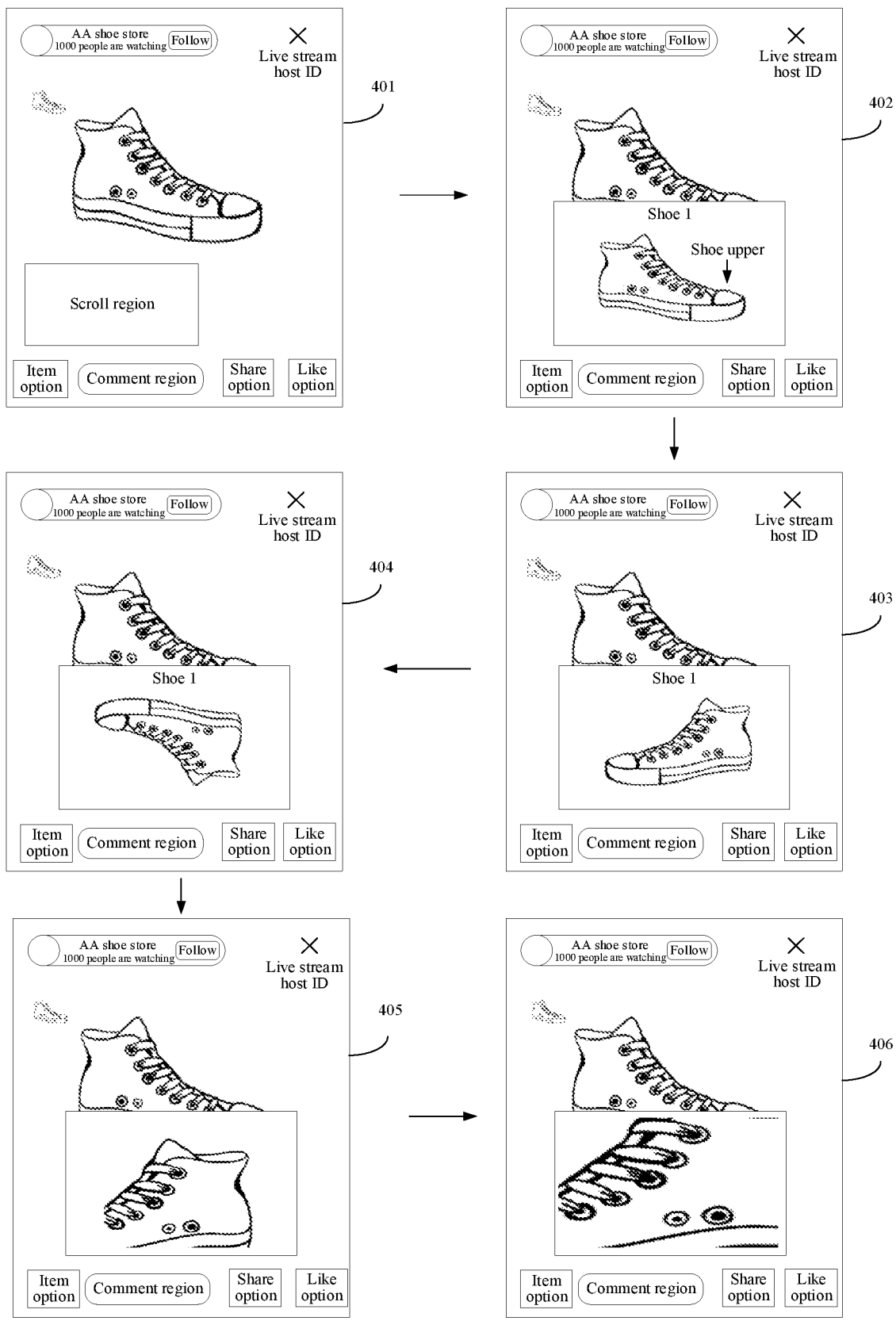
FIG. 4 is a schematic diagram of a live stream interface according to an embodiment of the present disclosure.

FIG. 4 is a schematic diagram of a live stream interface in a process of item display. Referring to FIG. 4, a live stream interface 401 is a live stream interface when the three-dimensional image is not displayed. The live stream interface 401 includes a live stream image and an item display button. The target item included in the live stream image is a shoe, and the shape of the item display button is a thumbnail image of the shoe. A scroll region in the live stream interface displays comments of the user watching the live stream, and a trigger operation is performed on an item option to display a plurality of reference items.

After performing the trigger operation on the item display button, the terminal obtains the three-dimensional image of the shoe, and the three-dimensional image of the shoe is displayed through a floating layer. A live stream interface 402 is a live stream interface when the three-dimensional image is displayed through the floating layer, where an item name of the target item is displayed above the three-dimensional image, and a tag associated with the partial two-dimensional image is further displayed in the three-dimensional image; a live stream interface 403 and a live stream interface 404 display three-dimensional images of the target item at different angles after a sliding operation is performed on the three-dimensional image in the live stream interface 402, where sliding directions of the sliding operation in the live stream interface 403 and the live stream interface 404 are different; and a live stream interface 405 is a live stream interface when displaying a two-dimensional partial image, where a partial image in the live stream interface 405 is a partial image of a heel part, and a live stream interface 406 is a live stream interface when a magnified two-dimensional partial image is displayed.

From a schematic diagram of the live stream interface in the process of item display shown in FIG. 4, it can be seen that the user can directly view the three-dimensional image and the two-dimensional partial image of the target item in the current live stream interface, and the user can fully know an appearance of the target item in the current live stream interface through the three-dimensional image and the two-dimensional partial image.

This embodiment of the present disclosure is described by only using an example in which 303 is executed first, then 304, and then 305 to 306 are executed. 303, 304, and 305 to 306 are three parallel solutions. In another embodiment, 304 is executed first, and then 303 and 305 to 306 are executed, or 305 to 306 are executed first, and then 303 and 304 are executed. This embodiment of the present disclosure does not limit a sequence of execution.

In addition, in related art, if the user needs to fully know an appearance of the item, the user needs to perform a trigger operation on an item link in the live stream interface to jump from a current live stream interface to an item detail interface of the item, and view an image of the item on the item detail interface to know the appearance of the item. However, in this manner, jumping is needed for the live stream interface, and if the user continues to watch the live stream after knowing the appearance of the item, the user needs to jump from the item detail interface to the live stream interface. The operations are cumbersome and inconvenient. However, in the manner provided in this embodiment of the present disclosure, the user can directly know the appearance of the item in the live stream interface, and does not need to perform interface jumping, which is more convenient.

This embodiment of the present disclosure is described by only taking a target item as an example, and the target item is any reference item in the live stream image. When the live stream image includes a plurality of items, each item is regarded as a target item, and a processing process is similar to that of this embodiment of the present disclosure, and is not repeated herein.

In the method provided in this embodiment of the present disclosure, the three-dimensional image of the target item can be directly displayed by triggering the item display button in the live stream interface, and the three-dimensional image of the target item is not affected by an environment where the live stream host is in and the beautification processing performed on the live stream image, so that an appearance of the target item can be truly reflected, and the display effect can be improved. Therefore, the user can fully know an appearance of the item according to the displayed three-dimensional image during watching a live stream.

In addition, after the three-dimensional image is displayed, a sliding operation is performed on the three-dimensional image, and images at different angles are displayed to the user, so that the user can know the item from more angles and more fully know the appearance of the item. A two-dimensional partial image of the target item is displayed. Compared with the three-dimensional image, the two-dimensional partial image has higher accuracy, which further improves the display effect of an image and enables the user to more fully know the appearance of the item through the two-dimensional partial image.

In addition, in this embodiment of the present disclosure, an item display button is set, and the user controls the display or closing of the three-dimensional image by performing a trigger operation on the item display button, and the operation is more flexible.

Figure 5:
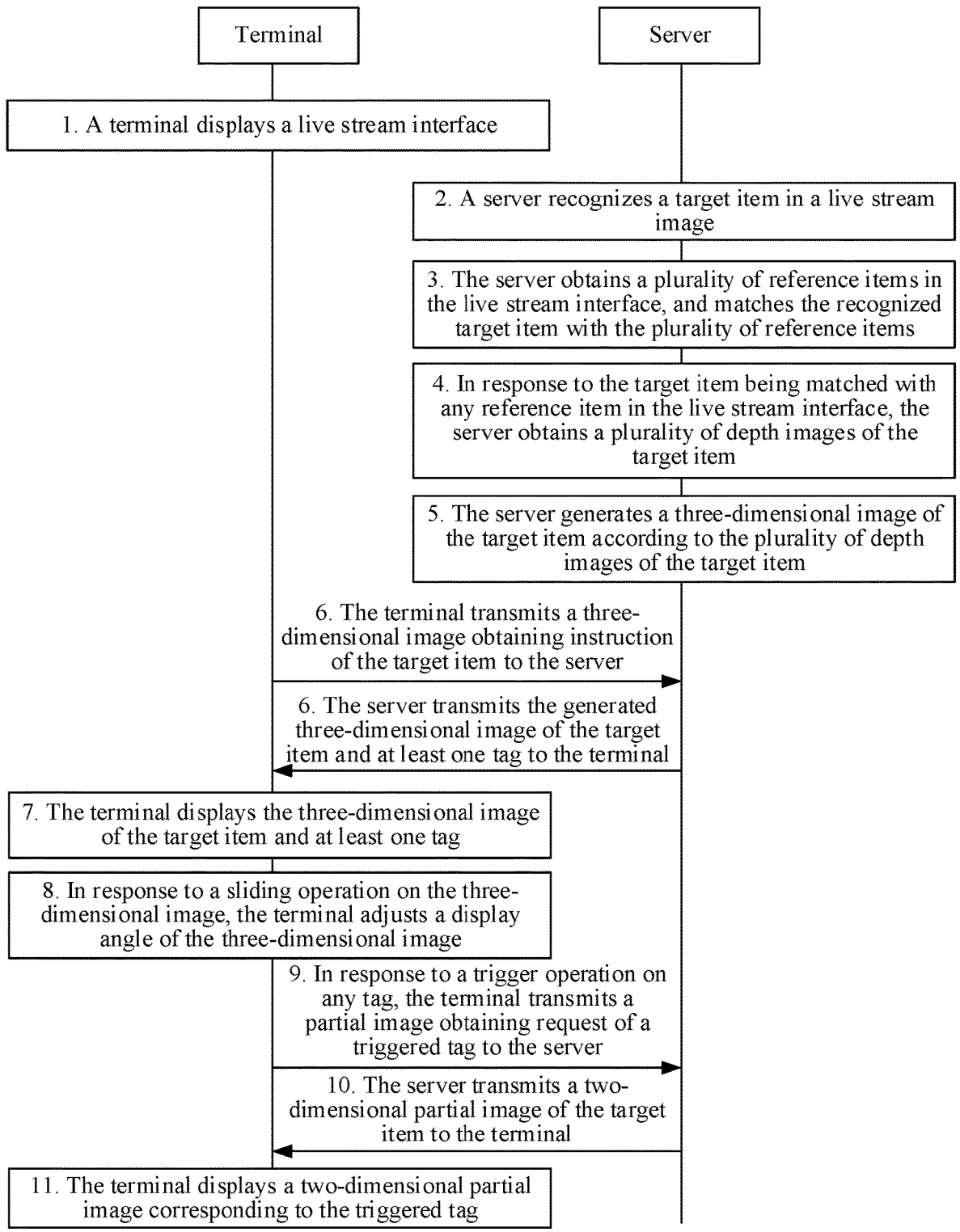
FIG. 5 is a flowchart of another item display method according to an embodiment of the present disclosure.

FIG. 5 is another flowchart of an item display method according to an embodiment of the present disclosure. Interaction bodies of this embodiment of the present disclosure are a terminal and a server. Referring to FIG. 5, the method includes:

1. The terminal displays a live stream interface, where the live stream interface displays an image of a live stream host recommending a target item to the user.

2. The server recognizes a target item in a live stream image.

3. The server obtains a plurality of reference items in the live stream interface, and matches the recognized target item with the plurality of reference items.

4. In response to the target item being matched with a reference item in the live stream interface, the server obtains a plurality of depth images of the target item.

5. The server generates a three-dimensional image of the target item according to the plurality of depth images of the target item.

The foregoing 2 to 5 are described by only using an example in which after the terminal displays the live stream interface, the server recognizes the target item in the live stream image and generates the three-dimensional image of the target item. In another embodiment, 2 to 5 are executed first, and then 1 is executed. That is, when receiving the live stream image transmitted by the host terminal, the server recognizes the target item in the received live stream image, generates the three-dimensional image of the target item, and then transmits the live stream image to the terminal, and the terminal displays the live stream image. In another embodiment, 1 and 2 are synchronously executed, and during generating the three-dimensional image of the target item, the terminal displays a live stream interface.

6. The terminal transmits a three-dimensional image obtaining instruction of the target item to the server, and the server transmits the generated three-dimensional image of the target item and at least one tag to the terminal.

7. The terminal displays the three-dimensional image of the target item and at least one tag.

8. In response to a sliding operation on the three-dimensional image, the terminal adjusts a display angle of the three-dimensional image.

9. In response to a trigger operation on any tag, the terminal transmits a partial image obtaining request of a triggered tag to the server.

10. The server transmits a two-dimensional partial image of the target item to the terminal.

11. The terminal displays a two-dimensional partial image corresponding to the triggered tag.

This embodiment of the present disclosure is described by only using an example in which a three-dimensional image of the target item is generated and displayed after the live stream is started. In another embodiment, before the live stream starts, a three-dimensional image of the target item is generated, and after the live stream starts, the generated three-dimensional image is obtained and displayed.

An implementation in this embodiment of the present disclosure is similar to the implementations in the embodiment shown in FIG. 2 and FIG. 3, and is not repeated herein.

Figure 6:
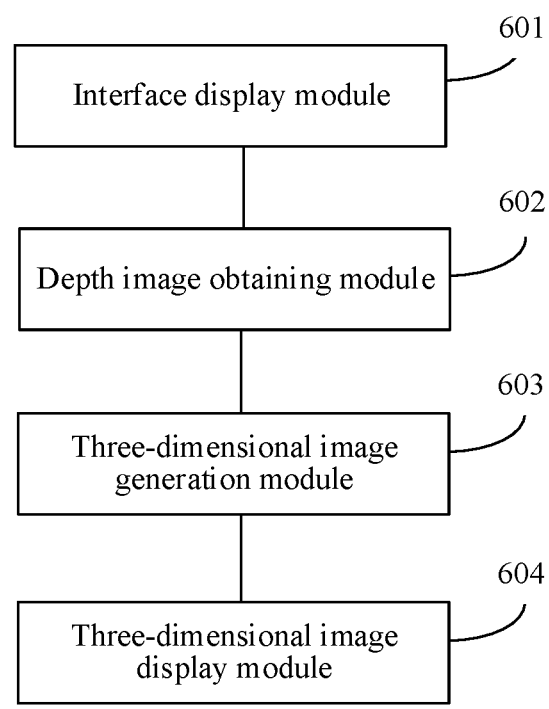
FIG. 6 is a schematic structural diagram of an item display apparatus according to an embodiment of the present disclosure.

FIG. 6 is a schematic structural diagram of an item display apparatus according to an embodiment of the present disclosure. Referring to FIG. 6, the apparatus includes:

an interface display module 601, configured to display a live stream interface, the live stream interface including a live stream image, and the live stream image including a target item;

a depth image obtaining module 602, configured to obtain a plurality of depth images of the target item according to a plurality of two-dimensional images of the target item, display angles of the target item in the plurality of two-dimensional images being different, and the depth image including pixel information and depth information;

a three-dimensional image generation module 603, configured to fuse the plurality of depth images to generate a three-dimensional image of the target item; and a three-dimensional image display module 604, configured to display the three-dimensional image through the live stream interface.

In the apparatus provided in this embodiment of the present disclosure, a corresponding three-dimensional image is generated for the target item according to the two-dimensional image of the target item displayed in the live stream interface. Because the three-dimensional image includes a plurality of display angles of the target item, and the three-dimensional image of the target item is not affected by an environment where the live stream host is in and the beautification processing performed on the live stream image, an appearance of the target item can be truly reflected, and the display effect can be improved. Therefore, the user can fully know an appearance of the item according to the displayed three-dimensional image during watching a live stream.

Figure 7:
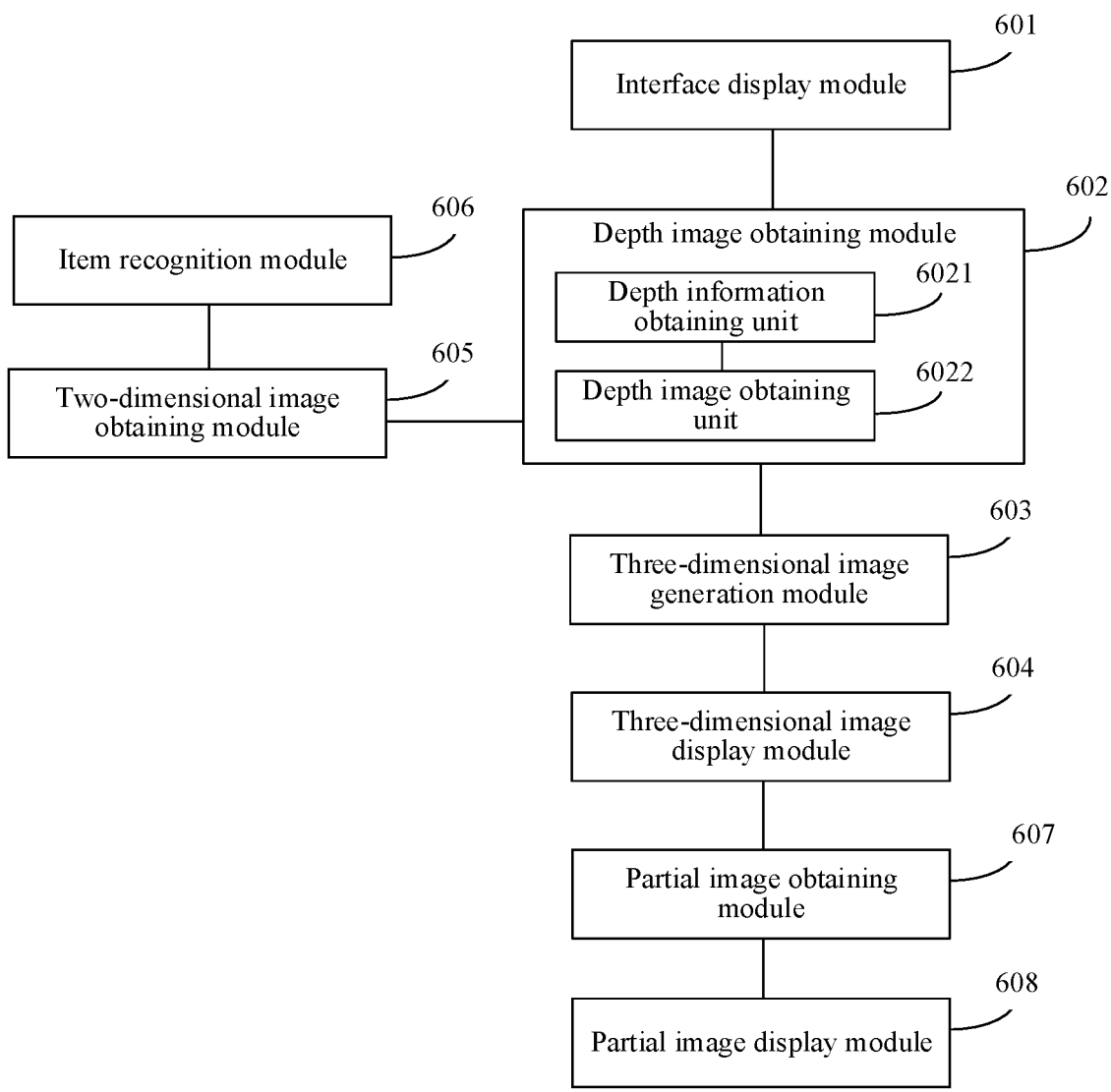
FIG. 7 is a schematic structural diagram of another item display apparatus according to an embodiment of the present disclosure.

In one embodiment, referring to FIG. 7, the apparatus further includes:

a two-dimensional image obtaining module 605, configured to obtain, in response to the target item being matched with a reference item in the live stream interface, a plurality of two-dimensional images of the target item.

In another embodiment, referring to FIG. 7, the two-dimensional image obtaining module 605 is further configured to:

obtain a similarity between the target item and any reference item in the live stream interface according to item information of the target item and item information of the reference item; and in response to the similarity being greater than a reference similarity, obtain a plurality of two-dimensional images of the target item.

In another embodiment, referring to FIG. 7, the apparatus further includes:

an item recognition module 606, configured to divide the live stream image into a plurality of image regions through a region division layer in a region recognition model, to obtain image features of the plurality of image regions;

the item recognition module 606, further configured to aggregate image information of the plurality of image regions through an aggregation layer in the image recognition model, to obtain an aggregated image feature of the target item; and the item recognition module 606, further configured to recognize the aggregated image feature through a recognition layer in the image recognition model, to determine a target item matched by the aggregated image feature.

In another embodiment, referring to FIG. 7, the two-dimensional image obtaining module 605 is further configured to:

obtain a plurality of two-dimensional images of the live stream interface, and respectively segment the plurality of two-dimensional images, the plurality of two-dimensional segmented images just includes the target item.

In another embodiment, referring to FIG. 7, the depth image obtaining module 602 includes:

a depth information obtaining unit 6021, configured to perform, for each two-dimensional image, depth allocation on the two-dimensional image to obtain depth information of each pixel in the two-dimensional image; and a depth image obtaining unit 6022, configured to fuse the depth information of each pixel with corresponding pixel information to obtain a depth image of the target item.

In another embodiment, the depth image obtaining module 602 is further configured to:

obtain depth images corresponding to the plurality of two-dimensional images, and use the depth images corresponding to the plurality of two-dimensional images as the depth images of the target item.

In another embodiment, the depth image obtaining module 602 is further configured to:

respectively perform mirror image processing on the plurality of two-dimensional images to obtain a mirrored two-dimensional image corresponding to each two-dimensional image; and obtain depth images corresponding to a plurality of mirrored two-dimensional images, and use the depth images corresponding to the plurality of mirrored two-dimensional images as the depth images of the target item.

In another embodiment, the live stream interface includes an item display button, and the three-dimensional image display module 604 is further configured to:

in response to a trigger operation on the item display button, display the three-dimensional image through the live stream interface.

In another embodiment, the live stream interface further includes at least one tag, the at least one tag being located in the three-dimensional image, and each tag being associated with a two-dimensional partial image of a corresponding position; and referring to FIG. 7, the apparatus further includes:

a partial image obtaining module 607, configured to obtain, in response to a trigger operation on any tag, a two-dimensional partial image associated with a triggered tag; and a partial image display module 608, configured to display the two-dimensional partial image through the live stream interface.

Figure 8:
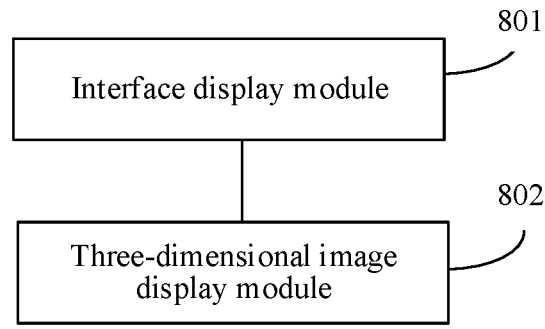
FIG. 8 is a schematic structural diagram of another item display apparatus according to an embodiment of the present disclosure.

FIG. 8 is a schematic structural diagram of an item display apparatus according to an embodiment of the present disclosure. Referring to FIG. 8, the apparatus includes:

an interface display module 801, configured to display a live stream interface, the live stream interface including a live stream image and an item display button, and the live stream image including a target item; and a three-dimensional image display module 802, configured to display, in response to a trigger operation on the item display button, a three-dimensional image of the target item through the live stream interface.

In the apparatus provided in this embodiment of the present disclosure, a three-dimensional image of the target item can be directly displayed by triggering the item display button in the live stream interface, and the three-dimensional image of the target item is not affected by an environment where the live stream host is in and the beautification processing performed on the live stream image, so that an appearance of the target item can be truly reflected, and the display effect can be improved. Therefore, the user can fully know an appearance of the item according to the displayed three-dimensional image during watching a live stream.

Figure 9:
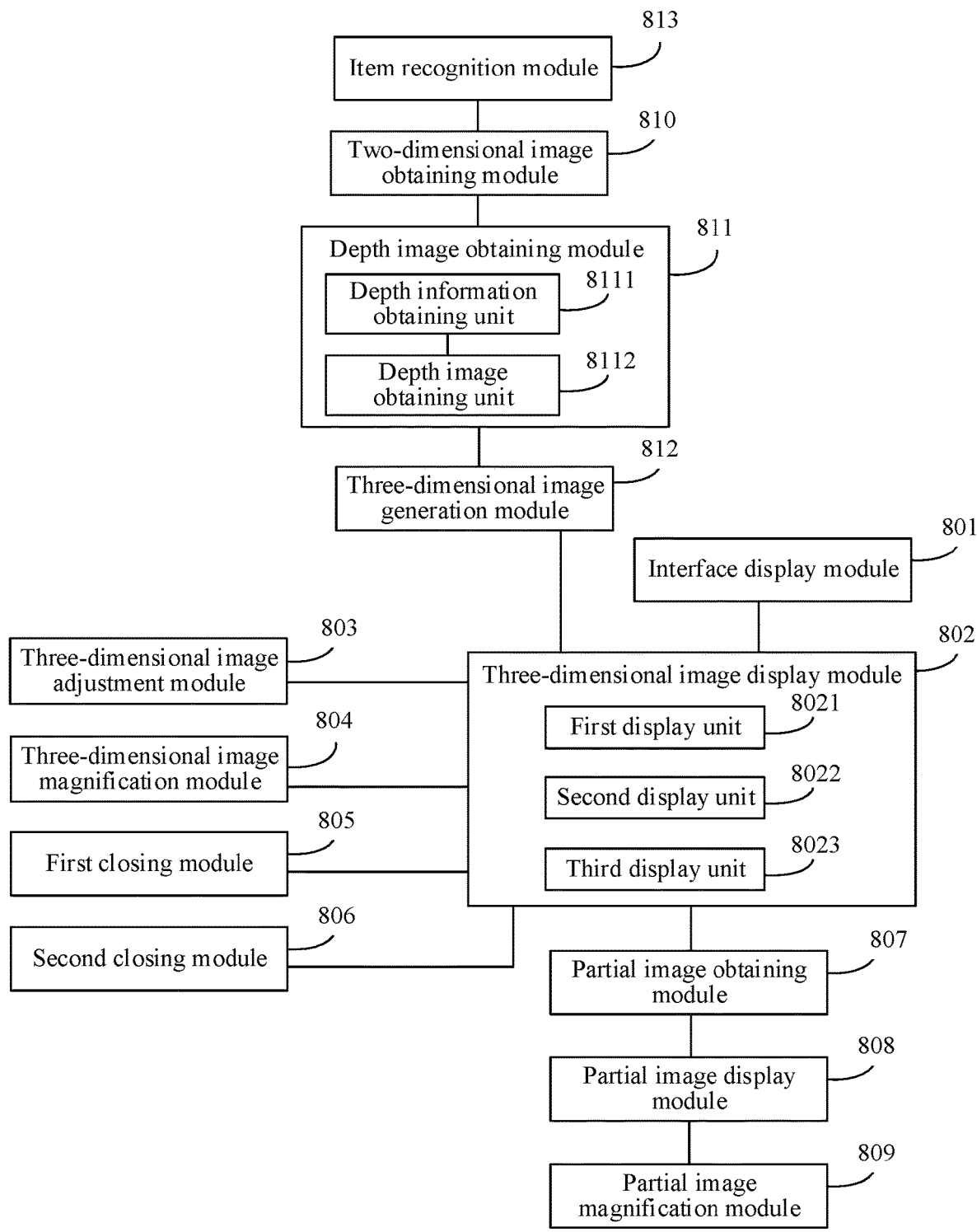
FIG. 9 is a schematic structural diagram of another item display apparatus according to an embodiment of the present disclosure.

In one embodiment, referring to FIG. 9, the apparatus further includes:

a three-dimensional image adjustment module 803, configured to adjust, in response to a sliding operation on the three-dimensional image, a display angle of the three-dimensional image according to the sliding operation.

In another embodiment, referring to FIG. 9, the apparatus further includes:

a three-dimensional image magnification module 804, configured to display a magnified three-dimensional image in response to a magnification operation on the three-dimensional image.

In another embodiment, the three-dimensional image display module 802 includes:

a first display unit 8021, configured to create a floating layer on an upper layer of the live stream image, and display the three-dimensional image through the floating layer.

In another embodiment, referring to FIG. 9, the apparatus further includes:

a first closing module 805, configured to close the floating layer in response to a trigger operation on other positions except the floating layer in the live stream interface.

In another embodiment, referring to FIG. 9, the apparatus further includes:

a second closing module 806, configured to close the floating layer in response to a re-trigger operation of the item display button.

In another embodiment, referring to FIG. 9, the three-dimensional image display module 802 includes:

a second display unit 8022, configured to display the three-dimensional image through an item display region of the live stream interface, the item display region being different from a region where the live stream image is located.

In another embodiment, referring to FIG. 9, the three-dimensional image display module 802 includes:

a third display unit 8023, configured to display a three-dimensional image and at least one tag through the live stream interface, the at least one tag being located in the three-dimensional image, and each tag being associated with a two-dimensional partial image of a corresponding position in the three-dimensional image.

In another embodiment, referring to FIG. 9, the three-dimensional image display module 802 is further configured to:

match the at least one two-dimensional partial image of the target item with the three-dimensional image, to determine a position of each two-dimensional partial image in the three-dimensional image;

create at least one tag associated with the two-dimensional partial image; and displays the three-dimensional image through the live stream interface, and displays a tag associated with the corresponding two-dimensional partial image at the position of each two-dimensional partial image in the three-dimensional image.

In another embodiment, referring to FIG. 9, the apparatus further includes:

a partial image obtaining module 807, configured to obtain, in response to the target item being matched with a reference item in the live stream interface, at least one two-dimensional partial image of any reference item as a two-dimensional partial image of the target item.

In another embodiment, referring to FIG. 9, the apparatus further includes:

a partial image display module 808, configured to obtain, in response to a trigger operation on any tag, a two-dimensional partial image associated with a triggered tag; and the partial image display module 808, further configured to display the two-dimensional partial image through the live stream interface.

In another embodiment, referring to FIG. 9, the apparatus further includes:

a partial image magnification module 809, configured to display, through the live stream interface, a magnified two-dimensional partial image in response to a magnification operation on the two-dimensional partial image.

In another embodiment, referring to FIG. 9, the partial image display module 808 is further configured to display, in response to the sliding operation on the two-dimensional partial image, another two-dimensional partial image matching a sliding direction according to a sliding direction of the sliding operation.

In another embodiment, referring to FIG. 9, the apparatus further includes:

a two-dimensional image obtaining module 810, configured to obtain a plurality of two-dimensional images of the target item, display angles of the target item in the plurality of two-dimensional images being different;

a depth image obtaining module 811, configured to obtain a plurality of depth images of the target item according to a plurality of two-dimensional images, the depth image including pixel information and depth information; and a three-dimensional image generation module 812, configured to fuse the plurality of depth images to generate a three-dimensional image of the target item.

In another embodiment, referring to FIG. 9, the two-dimensional image obtaining module 810 is further configured to:

in response to the target item being matched with a reference item in the live stream interface, obtain a plurality of two-dimensional images of the target item.

In another embodiment, referring to FIG. 9, the two-dimensional image obtaining module 810 is further configured to:

obtain a similarity between the target item and any reference item in the live stream interface according to item information of the target item and item information of the reference item; and in response to the similarity being greater than a reference similarity, obtain a plurality of two-dimensional images of the target item.

In another embodiment, referring to FIG. 9, the apparatus further includes:

an item recognition module 813, configured to divide the live stream image into a plurality of image regions through a region division layer in a region recognition model, to obtain image features of the plurality of image regions;

the item recognition module 813, further configured to aggregate image information of the plurality of image regions through an aggregation layer in the image recognition model, to obtain an aggregated image feature of the target item; and the item recognition module 813, further configured to recognize the aggregated image feature through a recognition layer in the image recognition model, to determine a target item matched by the aggregated image feature.

In another embodiment, referring to FIG. 9, the two-dimensional image obtaining module 810 is further configured to:

obtain a plurality of two-dimensional images of the live stream interface, and respectively segment the plurality of two-dimensional images, the plurality of two-dimensional segmented images just includes the target item.

In another embodiment, referring to FIG. 9, the depth image obtaining module 811 includes:

a depth information obtaining unit 8111, configured to perform, for each two-dimensional image, depth allocation on the two-dimensional image to obtain depth information of each pixel in the two-dimensional image; and a depth image obtaining unit 8112, configured to fuse the depth information of each pixel with corresponding pixel information to obtain a depth image of the target item.

In another embodiment, referring to FIG. 9, the depth image obtaining module 811 is further configured to:

obtain depth images corresponding to the plurality of two-dimensional images according to the plurality of two-dimensional images, and use the depth images corresponding to the plurality of two-dimensional images as the depth images of the target item.

In another embodiment, referring to FIG. 9, the depth image obtaining module 811 is further configured to:

respectively perform mirror image processing on the plurality of two-dimensional images to obtain a mirrored two-dimensional image corresponding to each two-dimensional image; and obtain depth images corresponding to a plurality of mirrored two-dimensional images, and use the depth images corresponding to the plurality of mirrored two-dimensional images as the depth images of the target item.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment of the present disclosure further provides a computer device. The computer device includes a processor and a memory, the memory storing at least one segment of program code, and the at least one segment of program code being loaded and executed by the processor to implement the following operations:

displaying a live stream interface, the live stream interface including a live stream image, and the live stream image including a target item;

obtaining a plurality of depth images of the target item according to a plurality of two-dimensional images of the target item, display angles of the target item in the plurality of two-dimensional images being different, and the depth image including pixel information and depth information;

fusing the plurality of depth images to generate a three-dimensional image of the target item; and displaying the three-dimensional image through the live stream interface.

In one embodiment, the at least one segment of program code is loaded by the processor to perform the following operations:

in response to the target item being matched with a reference item in the live stream interface, obtaining a plurality of two-dimensional images of the target item.

In another embodiment, the at least one segment of program code is loaded by the processor to perform the following operations:

obtaining a similarity between the target item and any reference item in the live stream interface according to item information of the target item and item information of the reference item; and in response to the similarity being greater than a reference similarity, obtaining a plurality of two-dimensional images of the target item.

In another embodiment, the at least one segment of program code is loaded by the processor to perform the following operations:

dividing the live stream image into a plurality of image regions through a region division layer in a region recognition model, to obtain image features of the plurality of image regions;

aggregating image information of the plurality of image regions through an aggregation layer in the image recognition model, to obtain an aggregated image feature of the target item; and recognizing the aggregated image feature through a recognition layer in the image recognition model, to determine a target item matched by the aggregated image feature.

In another embodiment, the at least one segment of program code is loaded by the processor to perform the following operations:

obtaining a plurality of two-dimensional images of the live stream interface, and respectively segmenting the plurality of two-dimensional images, the plurality of two-dimensional segmented images just includes the target item.

In another embodiment, the at least one segment of program code is loaded by the processor to perform the following operations:

for each two-dimensional image, performing depth allocation on the two-dimensional image to obtain depth information of each pixel in the two-dimensional image; and fusing the depth information of each pixel with corresponding pixel information to obtain a depth image of the target item.

In another embodiment, the at least one segment of program code is loaded by the processor to perform the following operations:

obtaining depth images corresponding to the plurality of two-dimensional images, and using the depth images corresponding to the plurality of two-dimensional images as the depth images of the target item.

In another embodiment, the at least one segment of program code is loaded by the processor to perform the following operations:

respectively performing mirror image processing on the plurality of two-dimensional images to obtain a mirrored two-dimensional image corresponding to each two-dimensional image; and obtaining depth images corresponding to a plurality of mirrored two-dimensional images, and use the depth images corresponding to the plurality of mirrored two-dimensional images as the depth images of the target item.

In another embodiment, the at least one segment of program code is loaded by the processor to perform the following operations:

in response to a trigger operation on the item display button, displaying the three-dimensional image through the live stream interface.

In another embodiment, the live stream interface further includes at least one tag, the at least one tag being located in the three-dimensional image, and each tag being associated with a two-dimensional partial image of a corresponding position; and the at least one segment of program code is loaded by the processor to perform the following operations:

in response to a trigger operation on any tag, obtaining a two-dimensional partial image associated with a triggered tag; and displaying the two-dimensional partial image through the live stream interface.

An embodiment of the present disclosure further provides a computer device. The computer device includes a processor and a memory, the memory storing at least one segment of program code, and the at least one segment of program code being loaded and executed by the processor to implement the following operations:

displaying a live stream interface, the live stream interface including a live stream image and an item display button, and the live stream image including a target item; and in response to a trigger operation on the item display button, displaying a three-dimensional image of the target item through the live stream interface.

In one embodiment, the at least one segment of program code is loaded by the processor to perform the following operations:

in response to a sliding operation on the three-dimensional image, adjusting a display angle of the three-dimensional image according to the sliding operation.

In another embodiment, the at least one segment of program code is loaded by the processor to perform the following operations:

in response to a magnification operation on the three-dimensional image, displaying a magnified three-dimensional image.

In another embodiment, the at least one segment of program code is loaded by the processor to perform the following operations:

creating a floating layer on an upper layer of the live stream image, and displaying the three-dimensional image through the floating layer.

In another embodiment, the at least one segment of program code is loaded by the processor to perform the following operations:

in response to a trigger operation on other positions except the floating layer in the live stream interface, closing the floating layer.

In another embodiment, the at least one segment of program code is loaded by the processor to perform the following operations:

in response to a re-trigger operation of the item display button, closing the floating layer.

In another embodiment, the at least one segment of program code is loaded by the processor to perform the following operations:

displaying the three-dimensional image through an item display region of the live stream interface, the item display region being different from a region where the live stream image is located.

In another embodiment, the at least one segment of program code is loaded by the processor to perform the following operations:

displaying a three-dimensional image and at least one tag through the live stream interface, the at least one tag being located in the three-dimensional image, and each tag being associated with a two-dimensional partial image of a corresponding position in the three-dimensional image.

In another embodiment, the at least one segment of program code is loaded by the processor to perform the following operations:

matching the at least one two-dimensional partial image of the target item with the three-dimensional image, to determine a position of each two-dimensional partial image in the three-dimensional image;

creating at least one tag associated with the two-dimensional partial image; and displaying the three-dimensional image through the live stream interface, and displaying a tag associated with the corresponding two-dimensional partial image at the position of each two-dimensional partial image in the three-dimensional image.

In another embodiment, the at least one segment of program code is loaded by the processor to perform the following operations:

in response to the target item being matched with a reference item in the live stream interface, obtaining at least one two-dimensional partial image of any reference item as a two-dimensional partial image of the target item.

In another embodiment, the at least one segment of program code is loaded by the processor to perform the following operations:

in response to a trigger operation on any tag, obtaining a two-dimensional partial image associated with a triggered tag; and displaying the two-dimensional partial image through the live stream interface.

In another embodiment, the at least one segment of program code is loaded by the processor to perform the following operations:

in response to a magnification operation on the two-dimensional partial image, displaying a magnified two-dimensional partial image through the live stream interface.

In another embodiment, the at least one segment of program code is loaded by the processor to perform the following operations:

in response to the sliding operation on the two-dimensional partial image, displaying another two-dimensional partial image matching a sliding direction according to a sliding direction of the sliding operation.

In another embodiment, the at least one segment of program code is loaded by the processor to perform the following operations:

obtaining a plurality of two-dimensional images of the target item, display angles of the target item in the plurality of two-dimensional images being different;

obtaining a plurality of depth images of the target item according to the plurality of two-dimensional images, the depth image including pixel information and depth information; and fusing the plurality of depth images to generate a three-dimensional image of the target item.

In another embodiment, the at least one segment of program code is loaded by the processor to perform the following operations:

in response to the target item being matched with a reference item in the live stream interface, obtaining a plurality of two-dimensional images of the target item.

In another embodiment, the at least one segment of program code is loaded by the processor to perform the following operations:

obtaining a similarity between the target item and any reference item in the live stream interface according to item information of the target item and item information of the reference item; and in response to the similarity being greater than a reference similarity, obtaining a plurality of two-dimensional images of the target item.

In another embodiment, the at least one segment of program code is loaded by the processor to perform the following operations:

dividing the live stream image into a plurality of image regions through a region division layer in a region recognition model, to obtain image features of the plurality of image regions;

aggregating image information of the plurality of image regions through an aggregation layer in the image recognition model, to obtain an aggregated image feature of the target item; and recognizing the aggregated image feature through a recognition layer in the image recognition model, to determine a target item matched by the aggregated image feature.

In another embodiment, the at least one segment of program code is loaded by the processor to perform the following operations:

obtaining a plurality of two-dimensional images of the live stream interface, and respectively segmenting the plurality of two-dimensional images, the plurality of two-dimensional segmented images just includes the target item.

In another embodiment, the at least one segment of program code is loaded by the processor to perform the following operations:

for each two-dimensional image, performing depth allocation on the two-dimensional image to obtain depth information of each pixel in the two-dimensional image; and fusing the depth information of each pixel with corresponding pixel information to obtain a depth image of the target item.

In another embodiment, the at least one segment of program code is loaded by the processor to perform the following operations:

obtaining depth images corresponding to the plurality of two-dimensional images, and using the depth images corresponding to the plurality of two-dimensional images as the depth images of the target item.

In another embodiment, the at least one segment of program code is loaded by the processor to perform the following operations:

respectively performing mirror image processing on the plurality of two-dimensional images to obtain a mirrored two-dimensional image corresponding to each two-dimensional image; and obtaining depth images corresponding to a plurality of mirrored two-dimensional images, and using the depth images corresponding to the plurality of mirrored two-dimensional images as the depth images of the target item.

Figure 10:
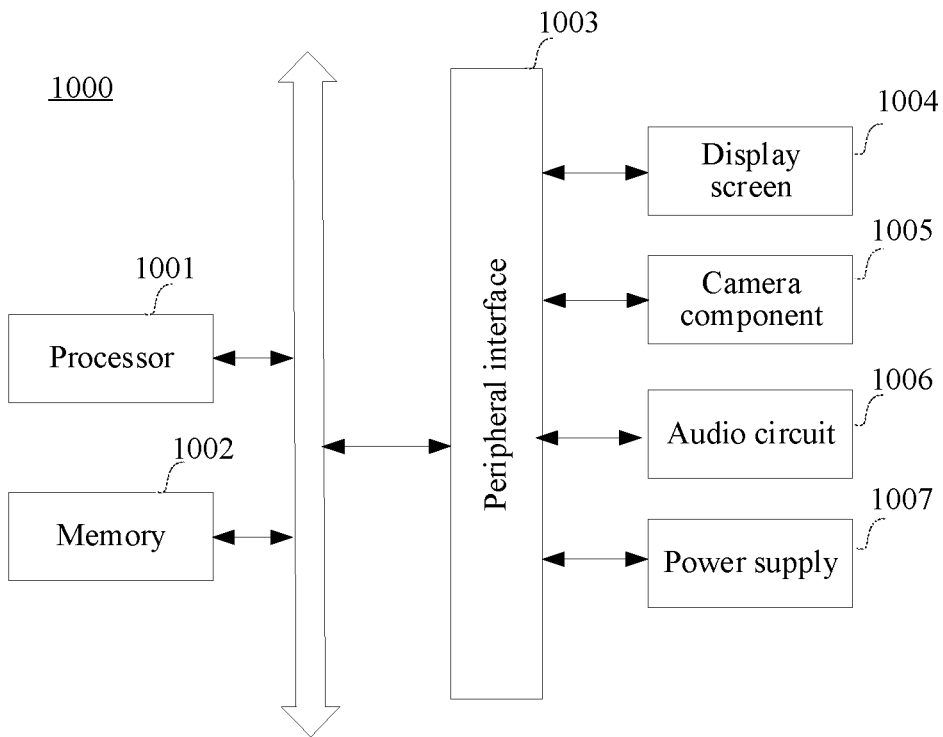
FIG. 10 is a schematic structural diagram of a terminal according to an embodiment of the present disclosure.

An example in which the computer device is served as a terminal is used for description below. FIG. 10 is a schematic structural diagram of a terminal 1000 according to an embodiment of the present disclosure. The terminal 1000 is configured to perform steps performed by the terminal in the foregoing embodiment. The terminal 1000 includes a processor 1001 and a memory 1002.

The processor 1001 may include one or more processing cores, and may be, for example, a 4-core processor or an 8-core processor. The processor 1001 may be implemented by using at least one hardware form of a digital signal processor (DSP), a field-programmable gate array (FPGA), and a programmable logic array (PLA).

The memory 1002 may include one or more computer-readable storage media. The computer-readable storage medium may be non-transient. The memory 1002 may further include a high-speed random access memory and a nonvolatile memory, for example, one or more disk storage devices or flash storage devices. In some embodiments, a non-transitory computer-readable storage medium in the memory 1002 is configured to store at least one segment of program code, the at least one segment of program code being configured to be executed by the processor 1001 to implement the item display method provided in the method embodiments of the present disclosure.

In some embodiments, the terminal 1000 may optionally include a peripheral interface 1003 and at least one peripheral. The processor 1001, the memory 1002, and the peripheral interface 1003 may be connected by using a bus or a signal cable. Each peripheral device may be connected to the peripheral interface 1003 by a bus, a signal line, or a circuit board. Specifically, the peripheral includes: at least one of a display screen 1004, a camera component 1005, an audio circuit 1006, and a power supply 1007.

The peripheral device interface 1003 may be configured to connect at least one input/output (I/O)-related peripheral device to the processor 1001 and the memory 1002.

The display screen 1004 is configured to display a user interface (UI). The UI may include a graph, a text, an icon, a video, and any combination thereof. When the display screen 1004 is a touch display screen, the display screen 1004 is further capable of collecting touch signals on or above a surface of the display screen 1004. The touch signal may be inputted, as a control signal, to the processor 1001 for processing. In this case, the display screen 1004 may be further configured to provide a virtual button and/or a virtual keyboard that are/is also referred to as a soft button and/or a soft keyboard.

The camera component 1005 is configured to capture an image or a video. In some embodiments, the camera assembly 1005 includes a front-facing camera and a rear-facing camera. Generally, the front-facing camera is disposed on a front panel of the terminal 1000, and the rear-facing camera is disposed on a back surface of the terminal 1000.

The audio circuit 1006 may include a microphone and a loudspeaker. The microphone is configured to acquire sound waves of a user and an environment, and convert the sound waves into an electrical signal to input to the processor 1001 for processing, or input to a radio frequency circuit for implementing voice communication. For the purpose of stereo acquisition or noise reduction, there may be a plurality of microphones respectively disposed at different portions of the terminal 1000.

The power supply 1007 is configured to supply power to components in the terminal 1000. The power supply 1007 may be an alternating current, a direct current, a primary battery, or a rechargeable battery. When the power supply 1007 includes a rechargeable battery, the rechargeable battery may be a wired rechargeable battery or a wireless rechargeable battery. The rechargeable battery may be further configured to support a fast charge technology.

A person skilled in the art may understand that the structure shown in FIG. 10 does not constitute a limitation on the terminal 1000 and that the terminal 1000 may include more or fewer assemblies than those shown in the figure, a combination of some assemblies, or different assembly arrangements.

Figure 11:
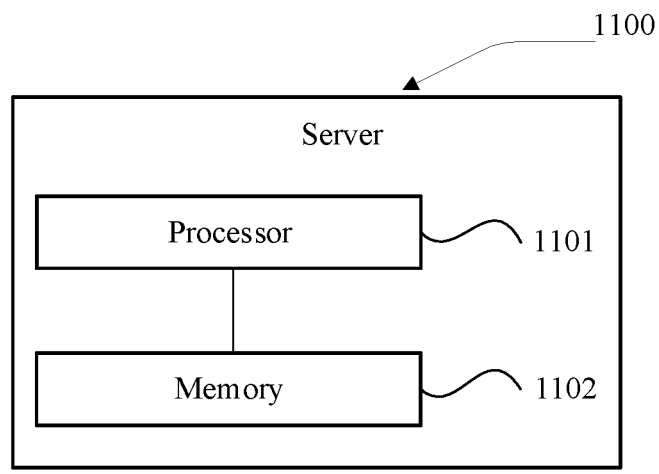
FIG. 11 is a schematic structural diagram of a server according to an embodiment of the present disclosure.

A description is made below by using an example in which a computer device is served as a server. FIG. 11 is a schematic structural diagram of a server according to an embodiment of the present disclosure. The server 1100 may vary greatly due to different configurations or performance, and may include one or more central processing units (CPUs) 1101 and one or more memories 1102. The memory 1102 stores at least one segment of program code, the at least one segment of program code being loaded and executed by the processor 1101 to implement the methods provided in the foregoing method embodiments. Certainly, the server may further include a wired or wireless network interface, a keyboard, an input/output interface and other components to facilitate input/output. The server may also include other components for implementing device functions. Details are not described herein again.

The server 1100 may be configured to perform the steps performed by the server in the foregoing embodiments.

An embodiment of the present disclosure further provides a computer-readable storage medium, the computer-readable storage medium storing at least one segment of program code, and the at least one segment of program code being loaded and executed by the processor to perform the following operations:

displaying a live stream interface, the live stream interface including a live stream image, and the live stream image including a target item;

obtaining a plurality of depth images of the target item according to a plurality of two-dimensional images of the target item, display angles of the target item in the plurality of two-dimensional images being different, and the depth image including pixel information and depth information;

fusing the plurality of depth images to generate a three-dimensional image of the target item; and displaying the three-dimensional image through the live stream interface.

In one embodiment, the at least one segment of program code is loaded by the processor to perform the following operations:

in response to the target item being matched with a reference item in the live stream interface, obtaining a plurality of two-dimensional images of the target item.

In another embodiment, the at least one segment of program code is loaded by the processor to perform the following operations:

obtaining a similarity between the target item and any reference item in the live stream interface according to item information of the target item and item information of the reference item; and in response to the similarity being greater than a reference similarity, obtaining a plurality of two-dimensional images of the target item.

In another embodiment, the at least one segment of program code is loaded by the processor to perform the following operations:

dividing the live stream image into a plurality of image regions through a region division layer in a region recognition model, to obtain image features of the plurality of image regions;

aggregating image information of the plurality of image regions through an aggregation layer in the image recognition model, to obtain an aggregated image feature of the target item; and recognizing the aggregated image feature through a recognition layer in the image recognition model, to determine a target item matched by the aggregated image feature.

In another embodiment, the at least one segment of program code is loaded by the processor to perform the following operations:

obtaining a plurality of two-dimensional images of the live stream interface, and respectively segmenting the plurality of two-dimensional images, the plurality of two-dimensional segmented images just includes the target item.

In another embodiment, the at least one segment of program code is loaded by the processor to perform the following operations:

for each two-dimensional image, performing depth allocation on the two-dimensional image to obtain depth information of each pixel in the two-dimensional image; and fusing the depth information of each pixel with corresponding pixel information to obtain a depth image of the target item.

In another embodiment, the at least one segment of program code is loaded by the processor to perform the following operations:

obtaining depth images corresponding to the plurality of two-dimensional images, and using the depth images corresponding to the plurality of two-dimensional images as the depth images of the target item.

In another embodiment, the at least one segment of program code is loaded by the processor to perform the following operations:

respectively performing mirror image processing on the plurality of two-dimensional images to obtain a mirrored two-dimensional image corresponding to each two-dimensional image; and obtaining depth images corresponding to a plurality of mirrored two-dimensional images, and using the depth images corresponding to the plurality of mirrored two-dimensional images as the depth images of the target item.

In another embodiment, the at least one segment of program code is loaded by the processor to perform the following operations:

in response to a trigger operation on the item display button, displaying the three-dimensional image through the live stream interface.

In another embodiment, the live stream interface further includes at least one tag, the at least one tag being located in the three-dimensional image, and each tag being associated with a two-dimensional partial image of a corresponding position; and the at least one segment of program code is loaded by the processor to perform the following operations:

in response to a trigger operation on any tag, obtaining a two-dimensional partial image associated with a triggered tag; and displaying the two-dimensional partial image through the live stream interface.

An embodiment of the present disclosure further provides a computer-readable storage medium, the computer-readable storage medium storing at least one segment of program code, and the at least one segment of program code being loaded and executed by the processor to perform the following operations:

displaying a live stream interface, the live stream interface including a live stream image and an item display button, and the live stream image including a target item; and in response to a trigger operation on the item display button, displaying a three-dimensional image of the target item through the live stream interface.

In one embodiment, the at least one segment of program code is loaded by the processor to perform the following operations:

in response to a sliding operation on the three-dimensional image, adjusting a display angle of the three-dimensional image according to the sliding operation.

In another embodiment, the at least one segment of program code is loaded by the processor to perform the following operations:

in response to a magnification operation on the three-dimensional image, displaying a magnified three-dimensional image.

In another embodiment, the at least one segment of program code is loaded by the processor to perform the following operations:

creating a floating layer on an upper layer of the live stream image, and displaying the three-dimensional image through the floating layer.

In another embodiment, the at least one segment of program code is loaded by the processor to perform the following operations:

in response to a trigger operation on other positions except the floating layer in the live stream interface, closing the floating layer.

In another embodiment, the at least one segment of program code is loaded by the processor to perform the following operations:

in response to a re-trigger operation of the item display button, closing the floating layer.

In another embodiment, the at least one segment of program code is loaded by the processor to perform the following operations:

displaying the three-dimensional image through an item display region of the live stream interface, the item display region being different from a region where the live stream image is located.

In another embodiment, the at least one segment of program code is loaded by the processor to perform the following operations:

displaying a three-dimensional image and at least one tag through the live stream interface, the at least one tag being located in the three-dimensional image, and each tag being associated with a two-dimensional partial image of a corresponding position in the three-dimensional image.

In another embodiment, the at least one segment of program code is loaded by the processor to perform the following operations:

matching the at least one two-dimensional partial image of the target item with the three-dimensional image, to determine a position of each two-dimensional partial image in the three-dimensional image;

creating at least one tag associated with the two-dimensional partial image; and displaying the three-dimensional image through the live stream interface, and displaying a tag associated with the corresponding two-dimensional partial image at the position of each two-dimensional partial image in the three-dimensional image.

In another embodiment, the at least one segment of program code is loaded by the processor to perform the following operations:

in response to the target item being matched with a reference item in the live stream interface, obtaining at least one two-dimensional partial image of any reference item as a two-dimensional partial image of the target item.

In another embodiment, the at least one segment of program code is loaded by the processor to perform the following operations:

in response to a trigger operation on any tag, obtaining a two-dimensional partial image associated with a triggered tag; and displaying the two-dimensional partial image through the live stream interface.

In another embodiment, the at least one segment of program code is loaded by the processor to perform the following operations:

in response to a magnification operation on the two-dimensional partial image, displaying a magnified two-dimensional partial image through the live stream interface.

In another embodiment, the at least one segment of program code is loaded by the processor to perform the following operations:

in response to the sliding operation on the two-dimensional partial image, displaying another two-dimensional partial image matching a sliding direction according to a sliding direction of the sliding operation.

In another embodiment, the at least one segment of program code is loaded by the processor to perform the following operations:

obtaining a plurality of two-dimensional images of the target item, display angles of the target item in the plurality of two-dimensional images being different;

obtaining a plurality of depth images of the target item according to the plurality of two-dimensional images, the depth image including pixel information and depth information; and fusing the plurality of depth images to generate a three-dimensional image of the target item.

In another embodiment, the at least one segment of program code is loaded by the processor to perform the following operations:

in response to the target item being matched with a reference item in the live stream interface, obtaining a plurality of two-dimensional images of the target item.

In another embodiment, the at least one segment of program code is loaded by the processor to perform the following operations:

obtaining a similarity between the target item and any reference item in the live stream interface according to item information of the target item and item information of the reference item; and in response to the similarity being greater than a reference similarity, obtaining a plurality of two-dimensional images of the target item.

In another embodiment, the at least one segment of program code is loaded by the processor to perform the following operations:

dividing the live stream image into a plurality of image regions through a region division layer in a region recognition model, to obtain image features of the plurality of image regions;

aggregating image information of the plurality of image regions through an aggregation layer in the image recognition model, to obtain an aggregated image feature of the target item; and recognizing the aggregated image feature through a recognition layer in the image recognition model, to determine a target item matched by the aggregated image feature.

In another embodiment, the at least one segment of program code is loaded by the processor to perform the following operations:

obtaining a plurality of two-dimensional images of the live stream interface, and respectively segmenting the plurality of two-dimensional images, the plurality of two-dimensional segmented images just includes the target item.

In another embodiment, the at least one segment of program code is loaded by the processor to perform the following operations:

for each two-dimensional image, performing depth allocation on the two-dimensional image to obtain depth information of each pixel in the two-dimensional image; and fusing the depth information of each pixel with corresponding pixel information to obtain a depth image of the target item.

In another embodiment, the at least one segment of program code is loaded by the processor to perform the following operations:

obtaining depth images corresponding to the plurality of two-dimensional images, and using the depth images corresponding to the plurality of two-dimensional images as the depth images of the target item.

In another embodiment, the at least one segment of program code is loaded by the processor to perform the following operations:

respectively performing mirror image processing on the plurality of two-dimensional images to obtain a mirrored two-dimensional image corresponding to each two-dimensional image; and obtaining depth images corresponding to a plurality of mirrored two-dimensional images, and use the depth images corresponding to the plurality of mirrored two-dimensional images as the depth images of the target item.

An embodiment of the present disclosure further provides a computer program, the computer program storing at least one segment of program code, the at least one segment of program code being loaded and executed by a processor to implement the operations performed in the item display method according to the foregoing embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like. The foregoing descriptions are merely optional embodiments of the embodiments of the present disclosure, but are not intended to limit the embodiments of the present disclosure. Any modification, equivalent replacement, or improvement made within the spirit and principle of the embodiments of the present disclosure shall fall within the protection scope of the present disclosure.

What is claimed is:

1. An item display method, applicable to a computer device, the method comprising:

displaying a live stream interface, the live stream interface comprising a live stream image, and the live stream image comprising a target item;

obtaining a plurality of depth images of the target item according to a plurality of two-dimensional images of the target item, display angles of the target item in the plurality of two-dimensional images being different, and the depth images comprising pixel information and depth information;

fusing the plurality of depth images to generate a three-dimensional image of the target item, wherein the live stream interface further comprises at least one displayed tag, the at least one displayed tag being located in the three-dimensional image, and each displayed tag being associated with a two-dimensional partial image of a corresponding position of the target item;

displaying the three-dimensional image through the live stream interface;

in response to a trigger operation on one of the at least one displayed tag, obtaining a corresponding two-dimensional partial image associated with the triggered displayed tag; and displaying the corresponding two-dimensional partial image through the live stream interface.

2. The method according to claim 1, wherein before the obtaining a plurality of depth images of the target item according to a plurality of two-dimensional images of the target item, the method further comprises:

in response to the target item being matched with a reference item in the live stream interface, obtaining the plurality of two-dimensional images of the target item.

3. The method according to claim 2, wherein the in response to the target item being matched with a reference item in the live stream interface, obtaining the plurality of two-dimensional images of the target item comprises:
  obtaining a similarity between the target item and the reference item in the live stream interface according to item information of the target item and item information of the reference item; and
  in response to the similarity being greater than a reference similarity, obtaining the plurality of two-dimensional images of the target item.

4. The method according to claim 1, wherein before the obtaining a plurality of depth images of the target item according to a plurality of two-dimensional images of the target item, the method further comprises:
  segmenting the live stream image into a plurality of image regions through a region division layer in a region recognition model, to obtain image features of the plurality of image regions;
  aggregating image information of the plurality of image regions through an aggregation layer in the image recognition model, to obtain an aggregated image feature of the target item; and
  recognizing the aggregated image feature through a recognition layer in the image recognition model, to determine the target item matched by the aggregated image feature.

5. The method according to claim 1, wherein before the obtaining a plurality of depth images of the target item according to a plurality of two-dimensional images of the target item, the method further comprises:
  obtaining a plurality of two-dimensional images of the live stream interface, and respectively segmenting the plurality of two-dimensional images, wherein the plurality of two-dimensional segmented images comprise the target item.

6. The method according to claim 1, wherein the obtaining a plurality of depth images of the target item according to a plurality of two-dimensional images of the target item comprises:
  for each two-dimensional image of the target item, performing depth allocation on the two-dimensional image to obtain depth information of each pixel in the two-dimensional image; and
  fusing the depth information of each pixel with corresponding pixel information to obtain a depth image of the target item.

7. The method according to claim 1, wherein the obtaining a plurality of depth images of the target item according to a plurality of two-dimensional images of the target item comprises:
  obtaining depth images corresponding to the plurality of two-dimensional images of the target item, and using the depth images corresponding to the plurality of two-dimensional images as the depth images of the target item.

8. The method according to claim 7, wherein the obtaining a plurality of depth images of the target item according to a plurality of two-dimensional images of the target item further comprises:
  respectively performing mirror image processing on the plurality of two-dimensional images to obtain a mirrored two-dimensional image corresponding to each two-dimensional image; and
  obtaining depth images corresponding to the plurality of mirrored two-dimensional images, and using the depth images corresponding to the plurality of mirrored two-dimensional images as the depth images of the target item.

9. The method according to claim 1, wherein the live stream interface further comprises an item display button, and the displaying the three-dimensional image through the live stream interface comprises:
  in response to a trigger operation on the item display button, displaying the three-dimensional image through the live stream interface.

10. An item display apparatus, comprising a processor and a memory, the memory storing at least one segment of program code, and the at least one segment of program code being loaded and executed by the processor to implement:
  displaying a live stream interface, the live stream interface comprising a live stream image, and the live stream image comprising a target item;
  obtaining a plurality of depth images of the target item according to a plurality of two-dimensional images of the target item, display angles of the target item in the plurality of two-dimensional images being different, and the depth images comprising pixel information and depth information;
  fusing the plurality of depth images to generate a three-dimensional image of the target item, wherein the live stream interface further comprises at least one displayed tag, the at least one displayed tag being located in the three-dimensional image, and each displayed tag being associated with a two-dimensional partial image of a corresponding position of the target item;
  displaying the three-dimensional image through the live stream interface;
  in response to a trigger operation on one of the at least one displayed tag, obtaining a corresponding two-dimensional partial image associated with the triggered displayed tag; and
  displaying the corresponding two-dimensional partial image through the live stream interface.

11. The apparatus according to claim 10, wherein before the obtaining a plurality of depth images of the target item according to a plurality of two-dimensional images of the target item, the processor is further configured to perform:
  in response to the target item being matched with a reference item in the live stream interface, obtaining the plurality of two-dimensional images of the target item.

12. The apparatus according to claim 11, wherein the in response to the target item being matched with a reference item in the live stream interface, obtaining the plurality of two-dimensional images of the target item comprises:
  obtaining a similarity between the target item and the reference item in the live stream interface according to item information of the target item and item information of the reference item; and
  in response to the similarity being greater than a reference similarity, obtaining the plurality of two-dimensional images of the target item.

13. The apparatus according to claim 10, wherein before the obtaining a plurality of depth images of the target item according to a plurality of two-dimensional images of the target item, the processor is further configured to perform:
  segmenting the live stream image into a plurality of image regions through a region division layer in a region recognition model, to obtain image features of the plurality of image regions;
  aggregating image information of the plurality of image regions through an aggregation layer in the image recognition model, to obtain an aggregated image feature of the target item; and recognizing the aggregated image feature through a recognition layer in the image recognition model, to determine the target item matched by the aggregated image feature.

14. The apparatus according to claim 10, wherein before the obtaining a plurality of depth images of the target item according to a plurality of two-dimensional images of the target item, the processor is further configured to perform:

obtaining a plurality of two-dimensional images of the live stream interface, and respectively segmenting the plurality of two-dimensional images, wherein the plurality of two-dimensional segmented images comprise the target item.

15. The apparatus according to claim 10, wherein the obtaining a plurality of depth images of the target item according to a plurality of two-dimensional images of the target item comprises:

for each two-dimensional image of the target item, performing depth allocation on the two-dimensional image to obtain depth information of each pixel in the two-dimensional image; and fusing the depth information of each pixel with corresponding pixel information to obtain a depth image of the target item.

16. The apparatus according to claim 10, wherein the obtaining a plurality of depth images of the target item according to a plurality of two-dimensional images of the target item comprises:

obtaining depth images corresponding to the plurality of two-dimensional images of the target item, and using the depth images corresponding to the plurality of two-dimensional images as the depth images of the target item.

17. The apparatus according to claim 16, wherein the obtaining a plurality of depth images of the target item according to a plurality of two-dimensional images of the target item further comprises:

respectively performing mirror image processing on the plurality of two-dimensional images to obtain a mirrored two-dimensional image corresponding to each two-dimensional image; and obtaining depth images corresponding to the plurality of mirrored two-dimensional images, and using the depth images corresponding to the plurality of mirrored two-dimensional images as the depth images of the target item.

18. The apparatus according to claim 10, wherein the live stream interface further comprises an item display button, and the displaying the three-dimensional image through the live stream interface comprises:

in response to a trigger operation on the item display button, displaying the three-dimensional image through the live stream interface.

19. A non-transitory computer-readable storage medium, storing at least one segment of program code, the at least one segment of program code being loaded and executed by a processor to implement:

displaying a live stream interface, the live stream interface comprising a live stream image, and the live stream image comprising a target item;

obtaining a plurality of depth images of the target item according to a plurality of two-dimensional images of the target item, display angles of the target item in the plurality of two-dimensional images being different, and the depth images comprising pixel information and depth information;

fusing the plurality of depth images to generate a three-dimensional image of the target item, wherein the live stream interface further comprises at least one displayed tag, the at least one displayed tag being located in the three-dimensional image, and each displayed tag being associated with a two-dimensional partial image of a corresponding position of the target item;

displaying the three-dimensional image through the live stream interface;

in response to a trigger operation on one of the at least one displayed tag, obtaining a corresponding two-dimensional partial image associated with the triggered displayed tag; and displaying the corresponding two-dimensional partial image through the live stream interface.

* * * * *